(12) United States Patent
Ootsuki et al.

(10) Patent No.: US 8,450,517 B2
(45) Date of Patent: May 28, 2013

(54) PHOTOSENSITIVE COMPOUND AND ITS PHOTOSENSITIVE POLYMER

(75) Inventors: Daisuke Ootsuki, Ichihara (JP); Kazumi Nara, Ichihara (JP); Junichi Inagaki, Ichihara (JP); Mayumi Tanabe, Ichihara (JP)

(73) Assignees: JNC Corporation, Tokyo (JP); JNC Petrochemical Corporation, Tokyo (JP)

( * ) Notice: Subject to any disclaimer, the term of this patent is extended or adjusted under 35 U.S.C. 154(b) by 0 days.

(21) Appl. No.: 13/237,634

(22) Filed: Sep. 20, 2011

(65) Prior Publication Data

US 2012/0165491 A1 Jun. 28, 2012

(30) Foreign Application Priority Data

Sep. 22, 2010 (JP) .................. 2010-211729
Aug. 8, 2011 (JP) .................. 2011-172582

(51) Int. Cl.
| | |
|---|---|
| *C07C 69/75* | (2006.01) |
| *C07C 69/96* | (2006.01) |
| *C08G 63/02* | (2006.01) |
| *C08F 22/10* | (2006.01) |
| *C08F 20/10* | (2006.01) |
| *C08F 20/30* | (2006.01) |
| *G02F 1/1337* | (2006.01) |

(52) U.S. Cl.
USPC ............. 560/81; 558/260; 558/270; 528/272; 526/321; 526/303.1; 526/326; 526/328; 526/304; 349/123

(58) Field of Classification Search
USPC ..... 560/81; 558/260, 270; 528/272; 526/321, 526/328, 326, 303.1, 304; 349/123
See application file for complete search history.

(56) References Cited

FOREIGN PATENT DOCUMENTS

| | | |
|---|---|---|
| EP | 0588568 A2 | 3/1994 |
| EP | 0980016 A1 | 1/2000 |
| EP | 1103840 A2 | 5/2001 |
| JP | 01216301 A * | 8/1989 |
| JP | H11-015001 A | 1/1999 |
| JP | 2005-275364 A | 10/2005 |

OTHER PUBLICATIONS

Yasumasa, Takeuchi, Ekisho (Liquid Crystals, in English), vol. 3, No. 4, p. 262 (1999), edited by the editorial meeting in Japanese Liquid Crystal Society, published by Japanese Liquid Crystal Society. [English translation and original paper].

* cited by examiner

Primary Examiner — Karuna P Reddy
(74) Attorney, Agent, or Firm — Hogan Lovells US LLP

(57) ABSTRACT

The invention is to provide a photosensitive compound suitable for a photoalignment method, a photosensitive polymer prepared from the compound, a photoaligning agent by using the compound and a liquid crystal alignment film prepared from the photoaligning agent. A photosensitive compound represented by formula (1):

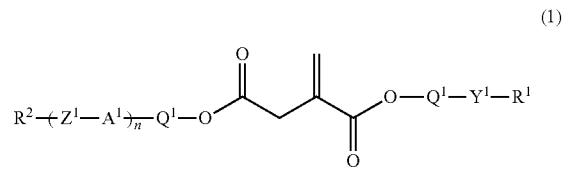

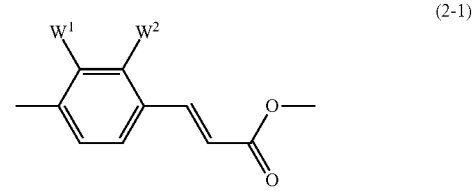

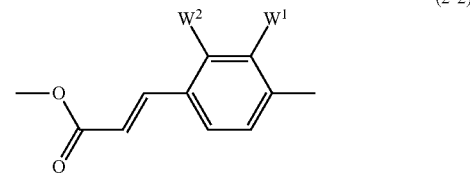

in formula (1), $Y^1$ is a divalent group represented by formula (2-1) or (2-2); $A^1$ is 1,4-phenylene or 1,4-cyclohexylene; $Z^1$ is a single bond, —COO— or —OCO—; $R^1$ and $R^2$ are each independently hydrogen, fluorine or alkyl having 1 to 5 carbons; $Q^1$ is independently a single bond or alkylene having 1 to 12 carbons; and n is 0 or 1. In formulas (2-1) and (2-2), $W^1$ and $W^2$ are each independently hydrogen, alkyl having 1 to 3 carbons or alkoxy having 1 to 3 carbons.

15 Claims, No Drawings

PHOTOSENSITIVE COMPOUND AND ITS PHOTOSENSITIVE POLYMER

This application is a Non-Provisional application, which claims priority upon Japanese application 2010-211729, filed on Sep. 22, 2010 and Japanese application 2011-172582, filed on Aug. 8, 2011; the contents of which are all herein incorporated by this reference in their entireties. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

BACKGROUND OF THE INVENTION

1. Field of the Invention

The invention relates to a photosensitive compound and a photosensitive polymer derived from the compound. It also relates to a photoaligning agent including the polymer, a liquid crystal alignment film prepared from the photoaligning agent, and an optical film or a liquid crystal display device containing the liquid crystal alignment film.

2. Related Art

A liquid crystal display device has been used for liquid crystal display apparatuses from the beginnings of monitors of notebook personal computers and desktop personal computers to the end of viewfinders of video cameras, projection displays, television sets and so forth. It is also utilized for optoelectronic-related devices such as light print heads, light Fourier transform devices and light valves. Use of nematic liquid crystals in a display device is the mainstream of conventional liquid crystal display devices. The liquid crystal display devices having a TN (Twisted Nematic) mode, a STN (Super Twisted Nematic) mode and TFT (Thin-Film-Transistor) mode have been put to practical use; in the TN mode, the direction of orientation of liquid crystals located near to one substrate and the direction of orientation of liquid crystals located near to the other substrate are twisted at an angle of 90 degrees; in the STN mode, the directions of orientation is normally twisted at an angle of 180 degrees or more; and in the TFT, thin-film-transistors are used.

However, in these liquid crystal display devices, the viewing angle, in which images can be seen properly, is narrow, and thus there are cases where brightness or contrast decreases when viewed diagonally, and brightness inversion occurs in a halftone image. In recent years, the subject of the viewing angle has been improved by use of a TN mode in combination with an optical compensation film, a MVA (Multi-domain Vertical Alignment) mode (see Patent document No. 1) using homeotropic orientation together with technology of protuberance, IPS (In-Plane Switching) mode utilizing a lateral electric field type (see Patent document No. 2), and so forth.

The development of technology of the liquid crystal display devices is attained not only by an improvement of the driving mode or the device structure, but also by an improvement of members used for making the display device. Among members used for making the display device, in particular, a liquid crystal alignment film is one of important elements related to the display quality of the liquid crystal display device, and the role of the liquid crystal alignment film becomes more important year after year as the quality of the display device is increased.

In the liquid crystal alignment film, it is required that the molecular orientation of liquid crystals is controlled for the purpose of uniform display characteristics of the liquid crystal display device. That is to say, it is required that the liquid crystal molecules are uniformly arranged in one direction, and a pretilt angle, which is a definite slope from the surface of a substrate, is generated.

An optical compensation film or a phase retardation film is used to realize an improvement of contrast or an increase of the range of a viewing angle in an image display apparatus, and examples are a stretched film having optical anisotropy or a film prepared by alignment, and then by polymerization of a polymerizable liquid crystal compound. A liquid crystal alignment film is also used to align this polymerizable liquid crystal compound. The liquid crystal alignment film, by which the direction of liquid crystal molecules on a substrate is uniformly arranged, is utilized in a variety of steps in the production of a liquid crystal display device, and technique of the film becomes important and necessary.

The liquid crystal alignment film is prepared from a liquid crystal aligning agent. The liquid crystal aligning agent that is used mainly at present is a solution in which a polyamic acid or a soluble polyimide is dissolved in an organic solvent. After such a solution has been applied to the surface of a substrate, a polyimide-based liquid crystal alignment film is formed by means such as heating. Although a variety of liquid crystal aligning agents other than those using the polyamic acid have been studied, they are hardly put to practical use in view of heat resistance, chemical resistance (liquid crystal resistance), coating properties, ability to orient liquid crystals, electrical characteristics, optical characteristics, display characteristics and so forth.

For industrial use, a rubbing method that is conveniently and rapidly possible to treat a wide area has been widely used for alignment treatment. The rubbing method is a treatment in which the surface of a liquid crystal alignment film is rubbed in one direction by use of a cloth planted with a fiber such as nylon, rayon and polyester, and the method makes it possible to orient liquid crystal molecules uniformly. However, the rubbing method mostly generates dusts or static electricity, and thus concerns are alignment defects or an effect to liquid crystal device.

In recent years, another method for controlling orientation of liquid crystals, by which the rubbing method is replaced, has been developed. In a photoalignment method where alignment treatment is carried out by irradiation with light, a variety of alignment by means such as photodecomposition, photoisomerization, photodimerization and phtobridging have been proposed (see, Non-patent document No. 1, Patent document No. 3 and Patent document No. 4). The photoalignment method is non-contact, which is different from the rubbing method, and the generation of dusts or static electricity is theoretically less than that in the rubbing treatment.

The molecular alignment of a monomolecular layer in liquid crystals that is contacted to the liquid crystal alignment film can be controlled by using a liquid crystal alignment film having an excellent orientation ability in which the alignment is treated by the photoalignment method. Accordingly, an improvement of the film for a liquid crystal display device can be expected.

PATENT DOCUMENT

Patent document No. 1: JP 2,947,350 B (1999).
Patent document No. 2: JP 2,940,354 B (1999).
Patent document No. 3: JP 2005-275364 A (2005).
Patent document No. 4: JP H11-015001 A (1999).

NON-PATENT DOCUMENT

Non-patent document No. 1: Ekisho (liquid cryatlas, in English), Vol. 3, No. 4, page 262 (1999), edited by the editorial meeting in Japanese Liquid Crystal Society, published by Japanese Liquid Crystal Society.

SUMMARY OF THE INVENTION

The invention concerns a photosensitive compound represented by formula (1):

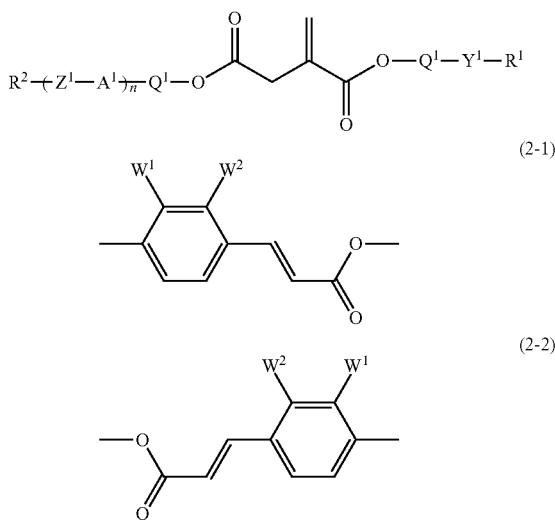

in formula (1), $Y^1$ is a divalent group represented by formula (2-1) or (2-2);

$A^1$ is 1,4-phenylene, 1,4-cyclohexylene, pyridine-2,5-diyl, pyrimidine-2,5-diyl, naphthalene-2,6-diyl, tetrahydronaphthalene-2,6-diyl or 1,3-dioxane-2,5-diyl, and in the 1,4-phenylene, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons;

$Z^1$ is a single bond, —COO—, —OCO—, —CH═CH—COO—, —OCO—CH═CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH═CH—, —CF═CF— or —C≡C—;

$R^1$ and $R^2$ are each independently hydrogen, fluorine, chlorine, —OH, —CN, —NO$_2$, trifluoromethyl, alkyl having 1 to 10 carbons or alkoxy having 1 to 10 carbons;

$Q^1$ is independently a single bond or alkylene having 1 to 12 carbons, and in the alkylene, arbitrary hydrogen my be replaced by fluorine and arbitrary —CH$_2$— may be replaced by —O—, —COO—, —OCO—, —CH═CH— or —C≡C—;

n is 0 to 3; and in formulas (2-1) and (2-2), $W^1$ and $W^2$ are each independently hydrogen, fluorine, chlorine, trifluoromethyl, alkyl having 1 to 5 carbons or alkoxy having 1 to 5 carbons.

The invention also concerns a composition, a polymer, a photosensitive material, a photoaligning agent, a liquid crystal alignment film and a liquid crystal display device.

DETAILED DESCRIPTION OF THE INVENTION

One of the advantages of the invention is to provide a photosensitive compound suitable for a photoalignment method and a photosensitive polymer derived from the compound. Another advantage is to provide a photoaligning agent including the polymer. A further advantage is to provide a liquid crystal alignment film, in which orientation ability is excellent, and is suitable for a photoalignment method, without the alignment treatment by a conventional rubbing method.

The inventors have earnestly studied and realized to provide a liquid crystal alignment film, in which heat treatment is not necessary, rubbing treatment is not necessary, a photoalignment method is suitable, and the stability of alignment is high, by using a photosensitive polymer as a liquid crystal aligning agent. The invention includes the following items.

Item 1. A photosensitive compound represented by formula (1):

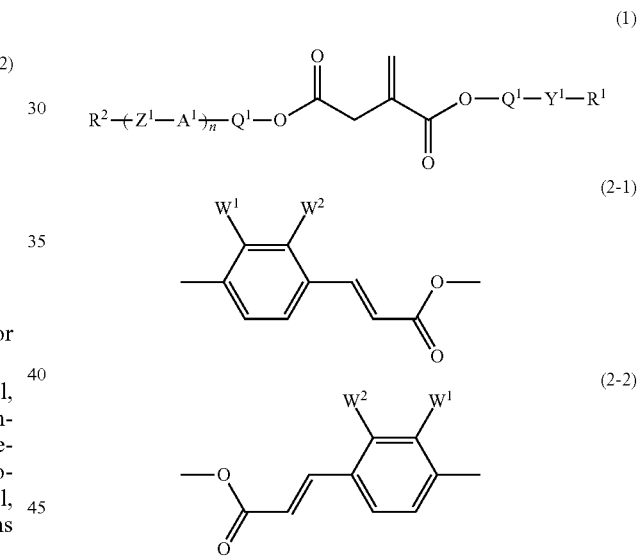

in formula (1), $Y^1$ is a divalent group represented by formula (2-1) or (2-2);

$A^1$ is 1,4-phenylene, 1,4-cyclohexylene, pyridine-2,5-diyl, pyrimidine-2,5-diyl, naphthalene-2,6-diyl, tetrahydronaphthalene-2,6-diyl or 1,3-dioxane-2,5-diyl, and in the 1,4-phenylene, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons;

$Z^1$ is a single bond, —COO—, —OCO—, —CH═CH—COO—, —OCO—CH═CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH═CH—, —CF═CF— or —C≡C—;

$R^1$ and $R^2$ are each independently hydrogen, fluorine, chlorine, —OH, —C≡N, —NO$_2$, trifluoromethyl, alkyl having 1 to 10 carbons or alkoxy having 1 to 10 carbons;

$Q^1$ is independently a single bond or alkylene having 1 to 12 carbons, and in the alkylene, arbitrary hydrogen my be replaced by fluorine and arbitrary —$CH_2$— may be replaced by —O—, —COO—, —OCO—, —CH=CH— or —C≡C—;

n is 0 to 3; and in formulas (2-1) and (2-2), $W^1$ and $W^2$ are each independently hydrogen, fluorine, chlorine, trifluoromethyl, alkyl having 1 to 5 carbons or alkoxy having 1 to 5 carbons.

Item 2. The photosensitive compound according to item 1, wherein in formula (1) according to item 1, $Y^1$ is a divalent group represented by formula (2-1) or (2-2) according to item 1;

$A^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;

$Z^1$ is a single bond, —COO—, —OCO—, —CH=CH—COO—, —OCO—CH=CH—, —OCO—$CH_2CH_2$— or —$CH_2CH_2$—COO—;

$R^1$ and $R^2$ are each independently hydrogen, fluorine, alkyl having 1 to 5 carbons or alkoxy having 1 to 5 carbons;

$Q^1$ is independently a single bond or alkylene having 1 to 12 carbons, and arbitrary —$CH_2$— may be replaced by —O—;

n is 0 or 1; and in formulas (2-1) and (2-2), $W^1$ and $W^2$ are each independently hydrogen, alkyl having 1 to 3 carbons or alkoxy having 1 to 3 carbons.

Item 3. A photosensitive compound represented by formula (1-1):

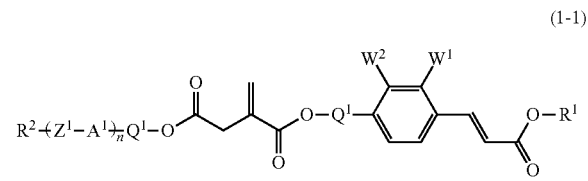

(1-1)

in formula (1-1), $W^1$ and $W^2$ are each independently hydrogen, alkyl having 1 to 3 carbons or alkoxy having 1 to 3 carbons;

$A^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;

$Z^1$ is a single bond, —COO—, —OCO—, —CH=CH—COO—, —OCO—CH=CH—, —OCO—$CH_2CH_2$— or —$CH_2CH_2$—COO—;

$R^2$ is hydrogen or alkyl having 1 to 5 carbons;

$R^2$ is hydrogen, fluorine, alkyl having 1 to 5 carbons or alkoxy having 1 to 5 carbons;

$Q^1$ is independently a single bond or alkylene having 1 to 12 carbons, and arbitrary —$CH_2$— may be replaced by —O—; and n is 0 or 1.

Item 4. A composition including the photosensitive compound according to any one of items 1 to 3.

Item 5. A polymer formed by polymerization of the photosensitive compound according to any one of items 1 to 3.

Item 6. A photosensitive polymer having a structural unit represented by formula (3):

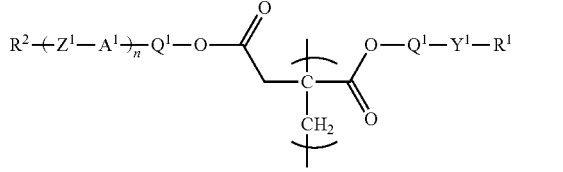

(3)

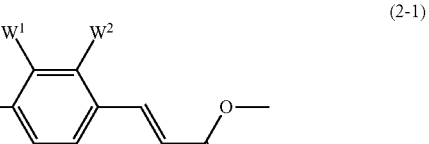

(2-1)

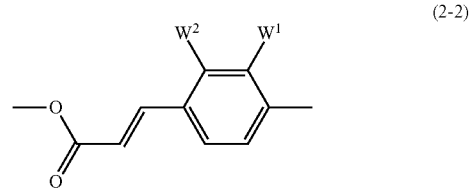

(2-2)

in formula (3), $Y^2$ is a divalent group represented by formula (2-1) or (2-2);

$A^1$ is 1,4-phenylene, 1,4-cyclohexylene, pyridine-2,5-diyl, pyrimidine-2,5-diyl, naphthalene-2,6-diyl, tetrahydronaphthalene-2,6-diyl or 1,3-dioxane-2,5-diyl, and in the 1,4-phenylene, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons;

$Z^1$ is a single bond, —COO—, —OCO—, —CH=CH—COO—, —OCO—CH=CH—, —OCO—$CH_2CH_2$—, —$CH_2CH_2$—COO—, —C≡C—COO—, —OCO—C≡C—, —$CH_2$O—, —O$CH_2$—, —$CF_2$O—, —OCF_2—, —CONH—, —NHCO—, —$(CH_2)_4$—, —$CH_2CH_2$—, —$CF_2CF_2$—, —CH=CH—, —CF=CF— or —C≡C—;

$R^1$ and $R^2$ are each independently hydrogen, fluorine, chlorine, —OH, —C≡N, —$NO_2$, trifluoromethyl, alkyl having 1 to 10 carbons or alkoxy having 1 to 10 carbons;

$Q^1$ is independently a single bond or alkylene having 1 to 12 carbons, and in the alkylene, arbitrary hydrogen may be replaced by fluorine and arbitrary —$CH_2$— may be replaced by —O—, —COO—, —OCO—, —CH=CH— or —C≡C—;

n is 0 to 3; and in formulas (2-1) and (2-2), $W^1$ and $W^2$ are each independently hydrogen, fluorine, chlorine, trifluoromethyl, alkyl having 1 to 5 carbons or alkoxy having 1 to 5 carbons.

Item 7. The photosensitive polymer according to item 6, wherein in formula (3) according to item 6, $Y^1$ is a divalent group represented by formula (2-1) or (2-2) according to item 6;

$A^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;

$Z^1$ is a single bond, —COO—, —OCO—, —CH=CH—COO—, —OCO—CH=CH—, —OCO—$CH_2CH_2$— or —$CH_2CH_2$—COO—;

$R^1$ and $R^2$ are each independently hydrogen, fluorine, alkyl having 1 to 5 carbons or alkoxy having 1 to 5 carbons;

$Q^1$ is independently a single bond or alkylene having 1 to 12 carbons, and arbitrary —$CH_2$— may be replaced by —O—;

n is 0 or 1; and in formulas (2-1) and (2-2), $W^1$ and $W^2$ are each independently hydrogen, alkyl having 1 to 3 carbons or alkoxy having 1 to 3 carbons.

Item 8. A photosensitive polymer having the structural unit represented by formula (3-1):

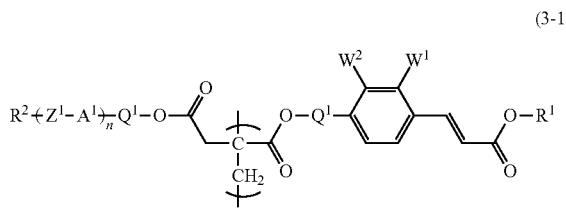

(3-1)

in formula (3-1), $W^1$ and $W^2$ are each independently hydrogen, alkyl having 1 to 3 carbons or alkoxy having 1 to 3 carbons;

$A^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;

$Z^1$ is a single bond, —COO—, —OCO—, —CH=CH—COO—, —OCO—CH=CH—, —OCO—$CH_2CH_2$— or —$CH_2CH_2$—COO—;

$R^1$ is hydrogen or alkyl having 1 to 5 carbons;

$R^2$ is hydrogen, fluorine, alkyl having 1 to 5 carbons or alkoxy having 1 to 5 carbons;

$Q^1$ is independently a single bond or alkylene having 1 to 12 carbons, and arbitrary —$CH_2$— may be replaced by —O—; and n is 0 or 1.

Item 9. The photosensitive polymer according to any one of items 5 to 8, wherein the weight-average molecular weight is in the range of approximately 1,000 to approximately 500,000.

Item 10. A homopolymer having the structural unit according to any one of items 5 to 8.

Item 11. A copolymer including the structural unit represented by formula (3) according to item 6 and at least one of structural units represented by the other formulas that are different from formula (3).

Item 12. A photosensitive material prepared from the polymer according to any one of items 5 to 11.

Item 13. A photoaligning agent for use in a liquid crystal alignment film prepared from the polymer according to any one of items 5 to 11.

Item 14. A liquid crystal alignment film prepared from the photoaligning agent according to item 13.

Item 15. A liquid crystal display device containing the liquid crystal alignment film according to item 14.

In the invention, complicated treatment processes in a conventional rubbing treatment is not necessary, and dusts or static electricity is not generated, since the liquid crystal alignment film is formed from the compound having a photoreactive group. Thus, a liquid crystal alignment film without alignment defects and with a high optical uniformity is formed. An optical film and a liquid crystal display device produced by using the liquid crystal alignment film can maintain a high alignment stability.

The invention will be explained in detail. At least one of polymers having a photoreactive group (hereinafter, referred to as "a photosensitive polymer") for the liquid crystal alignment film of the invention. The photosensitive polymer is a compound that undergoes one of the reactions such as photoisomerization, photodimerization and photodecomposition on irradiation with plane-polarized light. The photosensitive polymer is preferably a compound that undergoes photoisomerization or photodimerization on irradiation with light, and most preferably a compound that undergoes photodimerization. Desirable weight-average molecular weight of the photosensitive polymer is in the range of about 1,000 to about 500,000. The photosensitive polymer may be a polymer of one monomer or a copolymer of two or more monomers. In the case of copolymer of two or more monomers, a monomer having a plurality of polymerizable groups may be used.

In the photosensitive polymer, a compound that undergoes photoisomerization means a compound that undergoes steric isomerization or structural isomerization by the action of light. The photoisomerizable compound includes cinnamic acid compounds (K. Ichimura et al., Macromolecules, 30, 903 (1997)), azobenzene compounds (K. Ichimura et al., Mol. Cryst. Liq. Cryst., 298, 221 (1997)), hydrazino-β-ketoester compounds (S. Yamamura et al., Liquid Crystals, Vol. 13, No. 2, page 189 (1993)), stilbene compounds (J. G. Victor and J. M. Torkelson, Macromolecules, 20, 2241 (1987)), and spiropyran compounds (K. Ichimura et al., Chemistry Letters, page 1063 (1992); K. Ichimura et al., Thin Solid Films, Vol. 235, page 101 (1993)). A compound that undergoes photoisomerization includes compounds having these skeletons in the main chain of the polymer or in the side chain of the polymer. Among these, a desirable photoisomerizable compound has a double bond of —C=C— or —N=N—.

In the photosensitive polymer, a compound that undergoes photodimerization means a compound that undergoes cyclization by the addition between two groups by irradiation with light. The photodimerizable compound A compound that undergo dimerization includes cinnamic acid derivatives (M. Schadt et al., J. Appl. Phys., Vol. 31, No. 7, page 2155 (1992)), coumarin derivatives (M. Schadt et al., Nature., Vol. 381, page 212 (1996)), chalcone derivatives (Toshihiro Ogawa, et. al., Proceedings of Japanese Liquid Crystal Society Annual Meeting, 2AB03 (1997)), benzophenone derivatives (Y. K. Jang et al., SID Int. Symposium Digest, P-53 (1997)). The photodimerizable compound includes derivatives having these skeletons in the main chain or in the side chain of the polymer. Among these, a polymer having a skeleton of a cinnamic acid derivative or a coumarin derivative in the side chain is desirable, and a polymer having a skeleton of a cinnamic acid derivative in the side chain (side-chain polymer) is more desirable.

A material including such a photosensitive polymer is referred as to a photosensitive material. The photosensitive material can be utilized for photoresists, holography, light-responsive actuation materials, phase retardation films, polarized light-emitting films and so forth, in addition to the liquid crystal alignment film.

Cinnamic acid derivatives is used preferably as a compound having a photoreactive group that is used for the liquid crystal alignment film, in view of a high sensitivity of the photoreaction, transparency, the ease of production and so forth (JP 2007-224273 A). However, such a photosensitive polymer whose main chain is polyimide is required to be dissolved in a solvent such as N-methyl-2-pyrrolidone for the application to a substrate, and it is also required to be baked at a high temperature of about 180° C. for the formation of a film. It is thus difficult to use a substrate such as a TAC film that is eroded by a solvent such as N-methyl-2-pyrrolidone or that does not have heat resistance of 150° C. or more.

A polymer having the skeleton of a cinnamic acid derivative in the side chain is used for a liquid crystal alignment film (JP 4,011,652 B2 (2007)). For example, a vinyl ester group, an acryloyl group and a methacryloyl group are used as a polymerizable group for the structural unit of the photosensitive polymer. This is because of the ease of polymerization. However, side-chain polymers having these polymerizable groups show a tendency to be low in solvent resistance, thermal resistance, adhesion, mechanical strength and so forth. Although an improvement of thermal resistance and mechanical strength is possible in order to solve such subjects by a chemical method in which copolymerization with a polyfunctional acrylate is conducted or a physical method where a filler is added, such methods may introduce new subjects such as a decrease in photoreactivity or an decrease in transparency.

The compound represented by formula (1) of the invention has a itaconic acid moiety as a polymerizable group, and has a substituent in addition to the polymerizable group and a photosensitive group, which is different from derivatives having an acryloyl group. The substituent is useful for improving characteristics such as solvent resistance, thermal resistance, adhesion and mechanical strength. Thus, inventers prepared a photosensitive polymer including the structural unit represented by formula (3), and evaluated the polymer for use in a liquid crystal alignment film. As a result, the inventers found that orientation of liquid crystals occurred in a small amount of light dose in comparison with known materials, and the orientation ability was excellent. The inventers also found that the adhesion to a substrate and the solvent resistance were excellent, and the transmittance in the visible light range was high and the film hardness is high. Thus, the invention was completed.

A photosensitive compound represented by formula (1) may be abbreviated as the compound (1) in this specification. A compound represented by another formula may be abbreviated in a similar manner. The term "arbitrary" used for the explanation of the symbols in chemical formulas means that "not only the position of an element (or a functional group) but also its number can be selected without restriction". For example, the expression "arbitrary A may be replaced by B, C or D," means that one A may be replaced by any one of B, C and D, and that arbitrary two of A may be replaced by two of B, C or D, and also that arbitrary two of A may be replaced by B and C, B and D, or C and D. In the cases where arbitrary —CH$_2$— may be replaced by —O—, a replacement that forms a bonding group —O—O— is excluded.

The term "monofunctional" may mean "having one polymerizable group." The term. "polyfunctional" may mean "having at least two polymerizable groups". The term according to the number of the polymerizable group may be used. For example, the term "two functional" may mean "having two polymerizable groups."

"The derivative" or "the derivative A" may be abbreviated, when arbitrary functional group is introduced to the compound A or when the atom or the like of the compound A is replaced another atom or the like.

A photosensitive polymer may simply be abbreviated as a polymer. A liquid crystal display device and a liquid crystal alignment film may be abbreviated as a display device and an alignment film, respectively.

The photosensitive compound of the invention is represented by formulas (1-1) and (1-2). A desirable photosensitive compound is represented by formula (1-1).

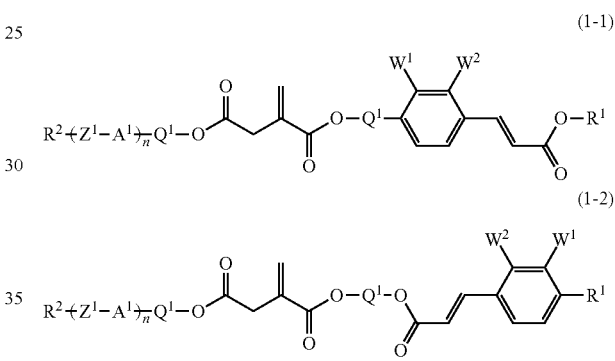

In formula (1-1), the definition of $W^1$, $W^2$, $A^1$, $Z^1$, $Q^1$, $R^1$, $R^2$ and n is the same with that of $W^1$, $W^2$, $A^1$, $Z^1$, $Q^1$, $R^1$, $R^2$ and n in formula (1-1) described above. The definition of each symbol in formula (1-2) is the same with that of the symbol in formula (1-1).

Specific examples of the photosensitive compound represented by formulas (1-1) and (1-2) will be shown below, and the invention is not limited by these specific examples.

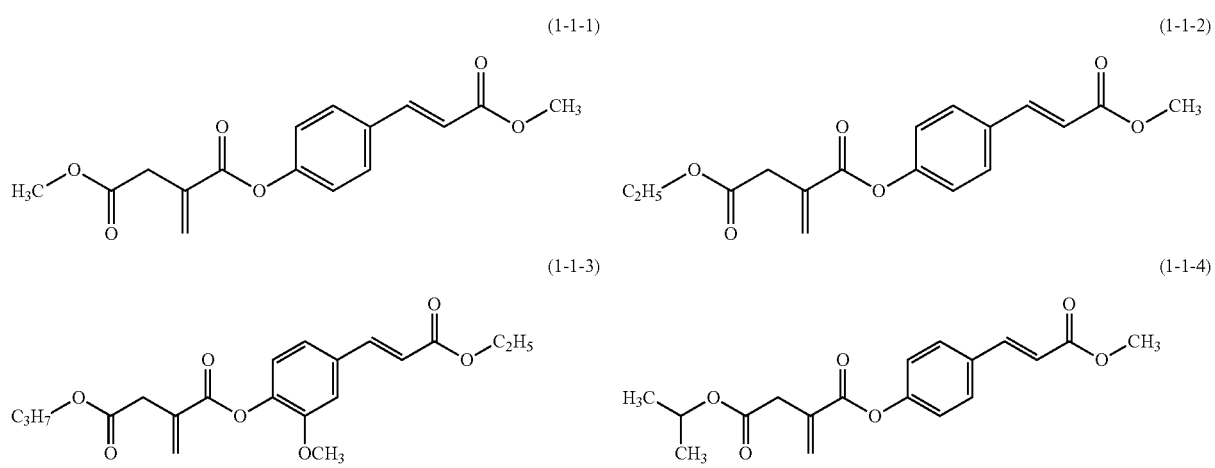

-continued
(1-1-5)
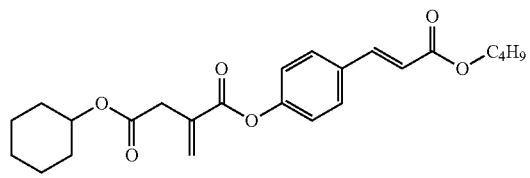
(1-1-6)
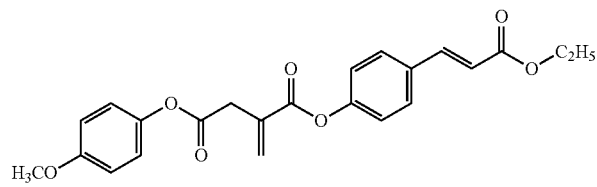
(1-1-7)
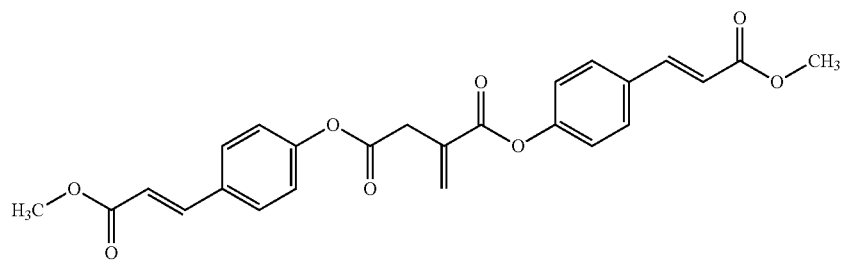
(1-1-8)
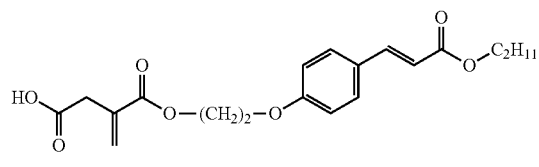
(1-1-9)
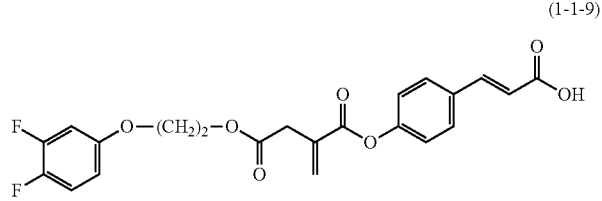
(1-1-10)
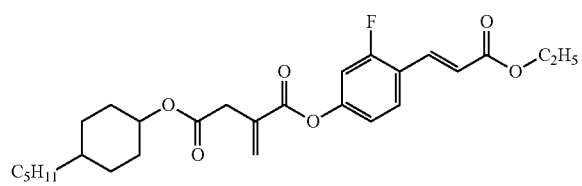
(1-1-11)
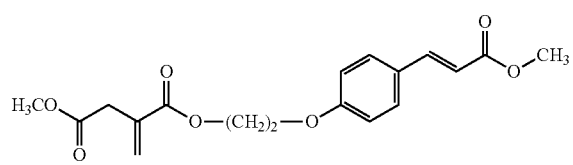
(1-1-12)
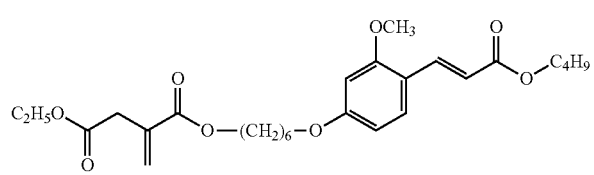
(1-1-13)
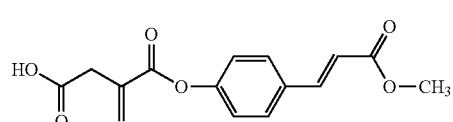
(1-1-14)
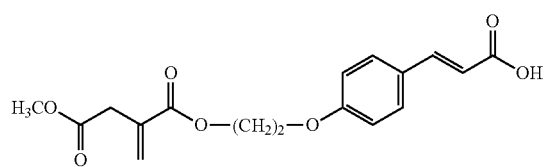
(1-2-1)
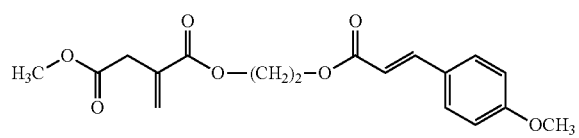
(1-2-2)
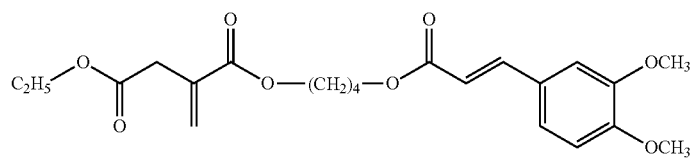
(1-2-3)
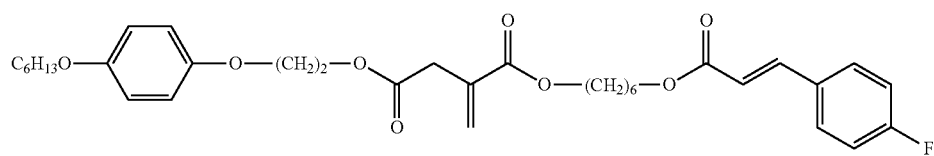

-continued (1-2-4)
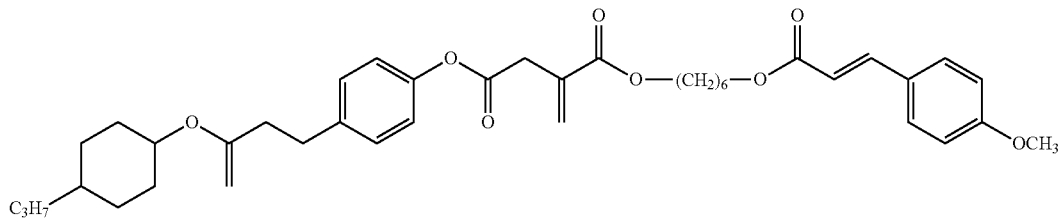

(1-2-5)
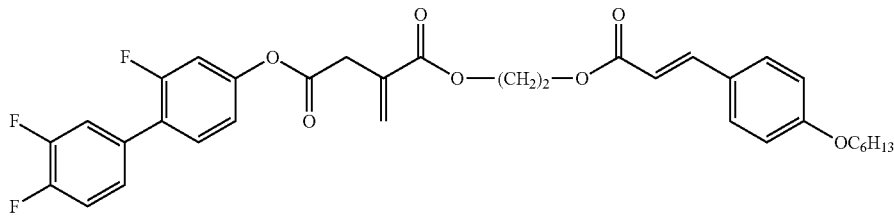

(1-2-6)
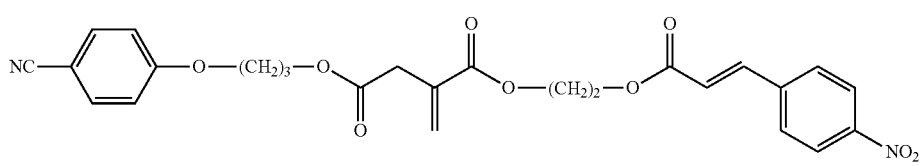

(1-2-7)
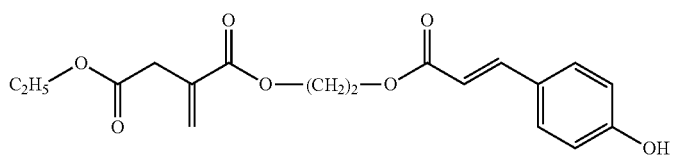

(1-2-8)
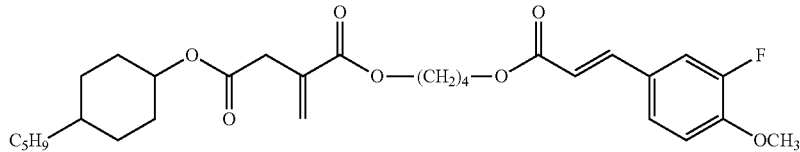

(1-2-9)
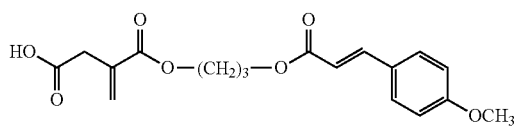

(1-2-10)
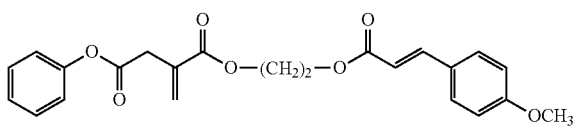

A photosensitive polymer is prepared by use of the photosensitive compound of the invention. The photosensitive polymer includes at least one structural unit represented by formula (3).

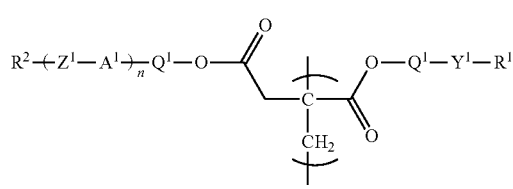
(3)

A desirable photosensitive polymer has the structural unit represented by formula (3-1).

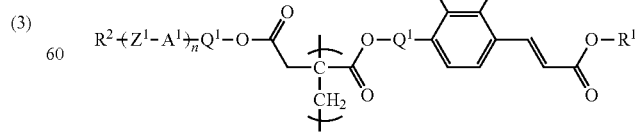
(3-1)

The definition of each symbol in formulas (3) and (3-1) is the same with that of the symbol in formulas (3) and (3-1) described above.

Specific examples of the photosensitive polymer having the structural unit represented by formula (3-1) will be shown below, and the invention is not limited by these specific examples.
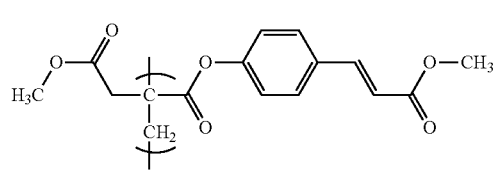
(3-1-1)
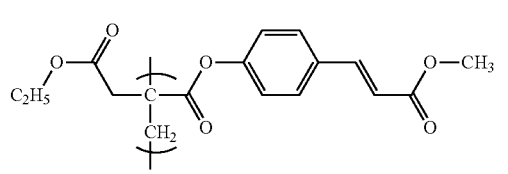
(3-1-2)
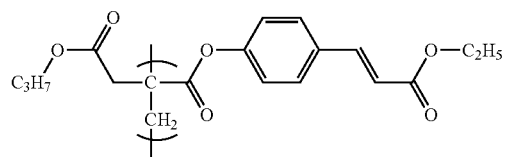
(3-1-3)
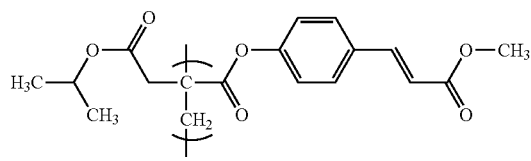
(3-1-4)
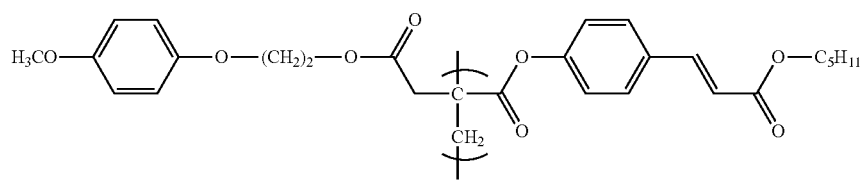
(3-1-5)
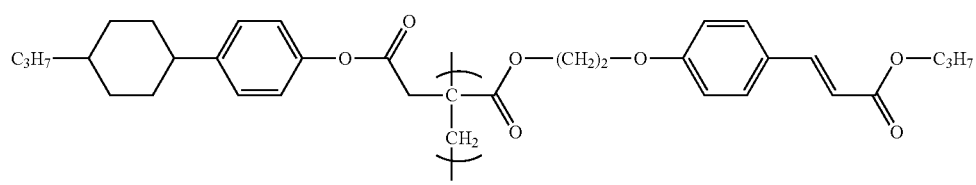
(3-1-6)
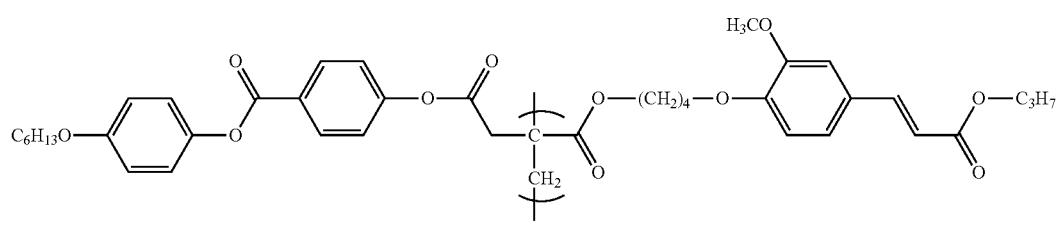
(3-1-7)
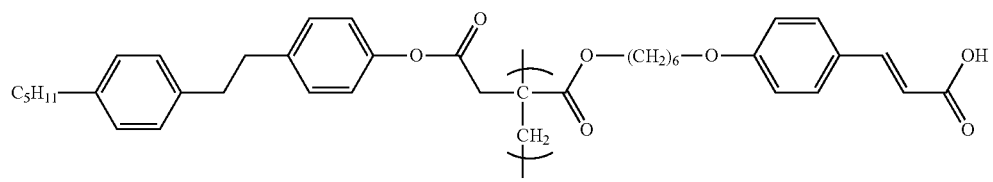
(3-1-8)
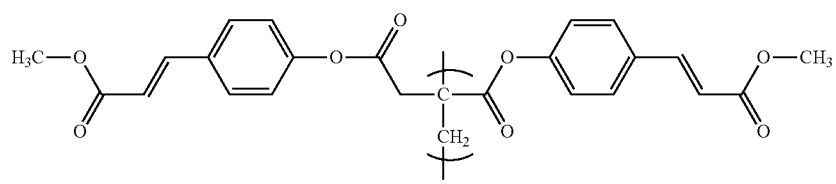
(3-1-9)
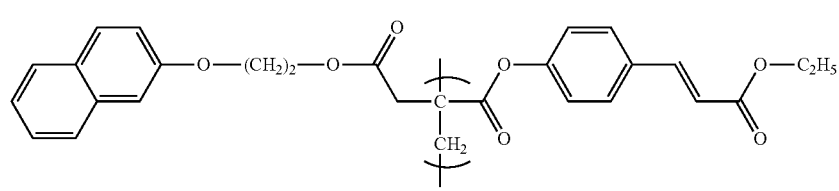
(3-1-10)

-continued

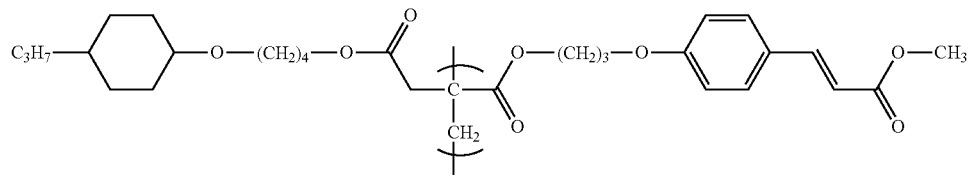
(3-1-11)

The photosensitive polymer may include one structural unit represented by formula (3) or two or more structural units represented by formula (3). The photosensitive polymer may be a copolymer including one or more structural units other than the structural unit formula (3). The structure of the structural unit other than the structural unit represented by formula (3) in the copolymer is not especially limited. A copolymer including two more the structural units may be a random copolymer or a block copolymer.

Another structural unit other than the structural unit represented by formula (3) is not especially limited. For example, the cinnamic acid derivatives represented by formulas (M-1) and (M-2) can be used as a structural unit.

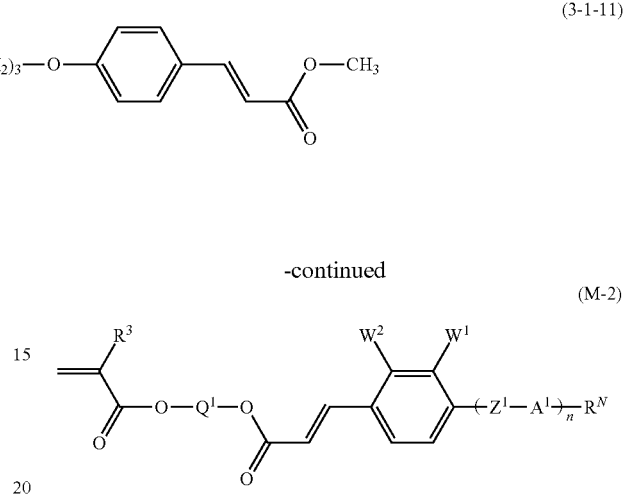
(M-1)

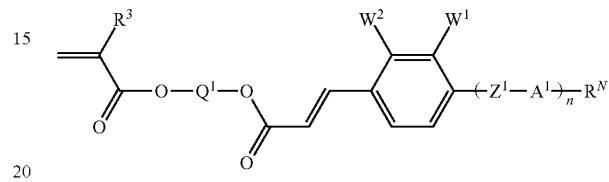
(M-2)

The definition of $W^1$, $W^2$, $A^1$, $Z^1$ and $Q^1$ in formulas (M-1) and (M-2) is the same with that of $W^1$, $W^2$, $A^1$, $Z^1$ and $Q^1$ in formula (3) described above; and n is 0 to 4; $R^3$ is hydrogen, methyl, fluorine, trifluoromethyl; $R^M$ is alkyl having 1 to 10 carbons, fluoroalkyl having 1 to 10 carbons or hydrogen; and $R^N$ is alkyl having 1 to 10 carbons, alkoxy having 1 to 10 carbons, hydrogen, chlorine, fluorine, —OH, —NO$_2$, —CF$_3$ or —OCF$_3$.

Specific examples are shown below. The invention is not limited by these specific examples.

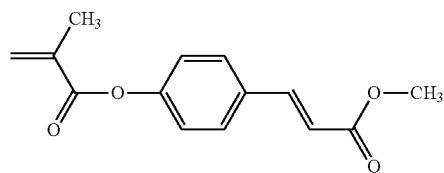
(M-1-1)

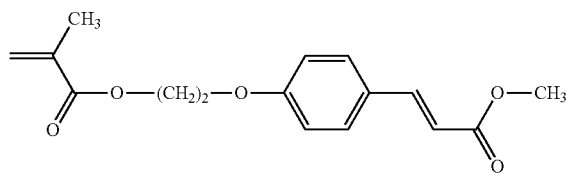
(M-1-2)

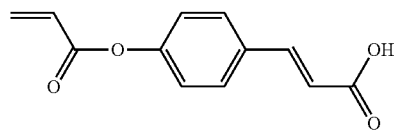
(M-1-3)

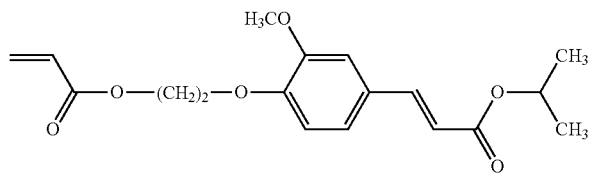
(M-1-4)

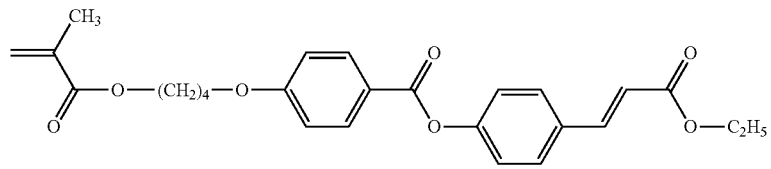
(M-1-5)

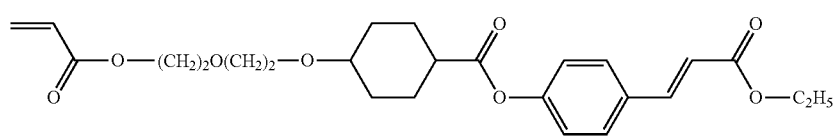
(M-1-6)

(M-1-7)
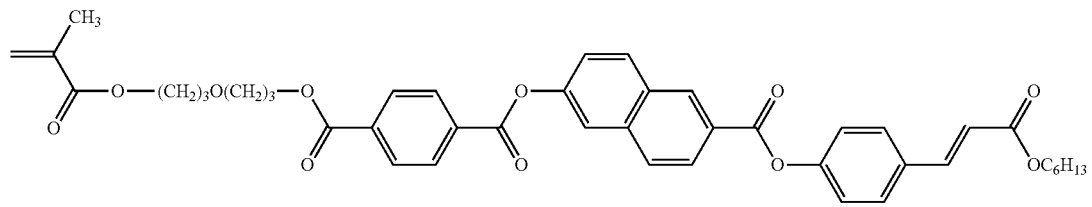
(M-1-8)
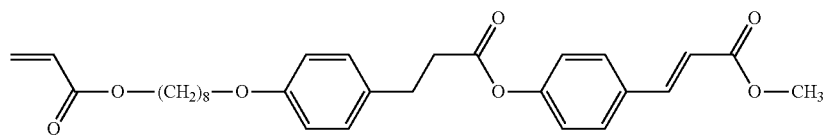
(M-1-9)
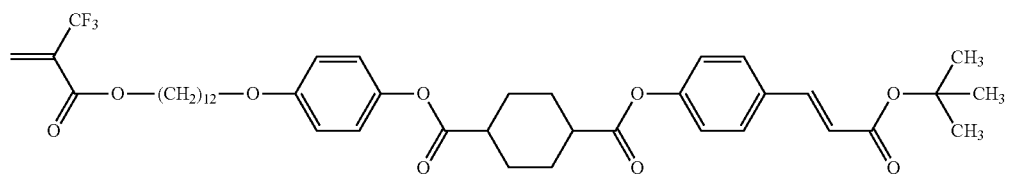
(M-1-10)
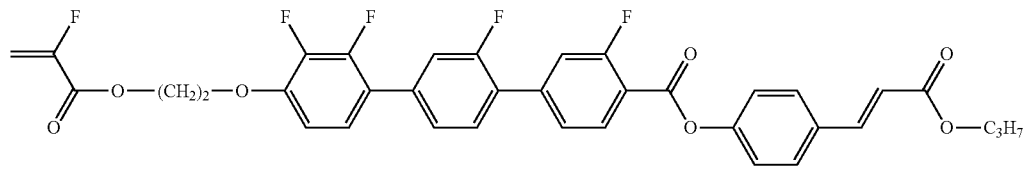
(M-2-1)
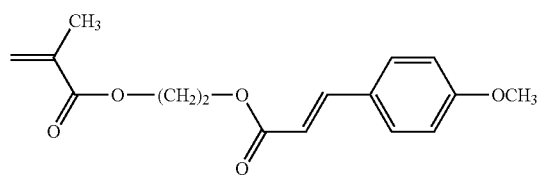
(M-2-2)
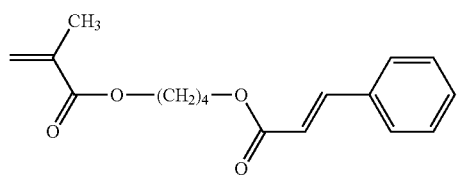
(M-2-3)
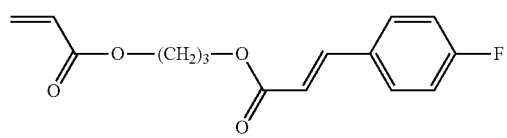
(M-2-4)
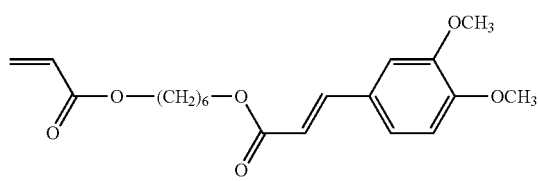
(M-2-5)
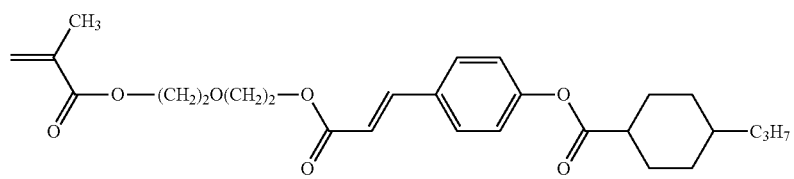
(M-2-6)
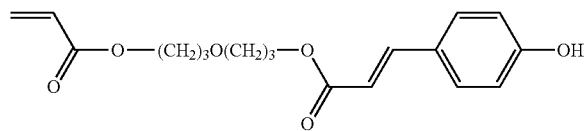
(M-2-7)
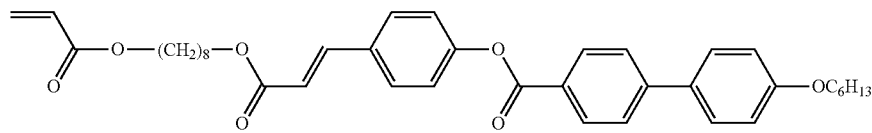

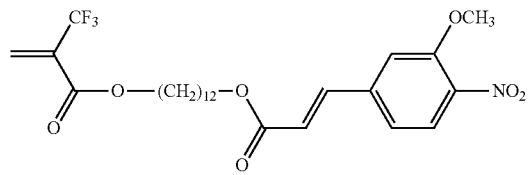

(M-2-8)

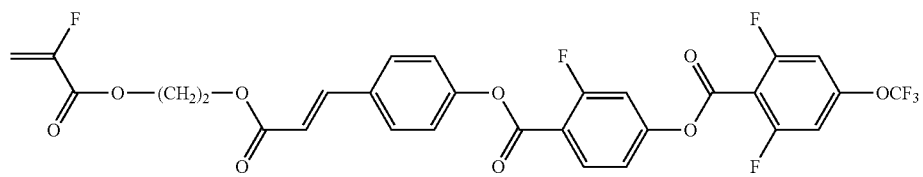

(M-2-9)

In the following description, the compound (M-1) and the compound (M-2) may be expressed generically as the compound (M). When the photosensitive polymer of the invention is a homopolymer of the compound (1), it has orientation ability, and has a tendency to decrease the solvent resistance since the degree of polymerization is decreased. A copolymer of the compound (1) and the compound (M) is more desirable in view of exhibiting the desired characteristics. A desirable ratio of the compound (1) is approximately 1% to 60% by weight, and a more desirable ratio is approximately 1% to 50% by weight based on the total weight of the compound (1) and the compound (M). The photosensitive polymer may include the structural unit derived from the compound (1), the structural unit derived from the compound (2) and a structural unit other than these structural units.

Another structural unit other than the structural unit derived from formulas (M-1) and (M-2) includes the structural unit of a monomer that is industrially available and is able to undergo radical polymerization.

Specific examples of a monomer from which another structural unit is derived are exemplified. The invention is not limited to these specific examples.

Such a monomer is a compound having at least one ethylenic unsaturated double bond. The monomer includes (meth)acrylic acids or their derivatives, such as (meth)acrylic acid, methyl(meth)acrylate, ethyl (meth)acrylate, butyl (meth)acrylate, 2-ethylhexyl (meth)acrylate, phenyl (meth)acrylate and benzyl (meth)acrylate;

hydroxyalkyl esters such as 2-hydroxyethyl (meth)acrylate, 2-hydroxypropyl (meth)acrylate, 2-hydroxybutyl (meth)acrylate and 3-hydroxypropyl (meth)acrylate;

monofunctional (meth)acrylate compounds such as w-carboxypolycaprolactone mono(meth)acrylate, phthalic acid monohydroxyethyl(meth)acrylate and 2-hydroxy-3-phenoxypropyl (meth)acrylate;

polyfunctional (meth)acrylate compounds such as 1,4-butanediol di(meth)acrylate, 1,6-hexanediol di(meth)acrylate, ethylene glycol di(meth)acrylate, neopentyl glycol di(meth)acrylate, diethylene glycol di(meth)acrylate, triethylene glycol di(meth)acrylate, polyethylene glycol di(meth)acrylate, hydroxypivalic acid neopentyl glycol di(meth)acrylate, trimethylolpropane tri(meth)acrylate, ethoxylated trimethylolpropane tri(meth)acrylate, ditrimethylolpropane tetra(meth)acrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, dicyclopentanyl di(meth)acrylate, ethoxylated hydrogenated bisphenol-A di(meth)acrylate, ethoxylated bisphenol A di(meth)acrylate, ethoxylated bisphenol-F di(meth)acrylate, ethoxylated bisphenol-S di(meth)acrylate, hydroxypropyl di(meth)acrylate, diethylene glycol bishydroxypropyl (meth)acrylate and monohydroxypentaerythritol tri(meth)acrylate; and (meth)acrylate compounds having a cyclic ether group such as glycidyl (meth)acrylate, (3-methyl-3-oxetanyl)methyl (meth)acrylate and (3-ethyl-3-oxetanyl)methyl (meth)acrylate.

Commercial monofunctional or polyfunctional (meth)acrylate compounds may be used as it is. Specifically, Aronix M-5400 (phthalic acid monohydroxyethylacrylate), Aronix M-5700 (2-hydroxy-3-phenoxypropylacrylate), Aronix M-215 (isocyanuric acid ethylene oxide-modified diacrylate), Aronix M-220 (tripropylene glycol diacrylate), Aronix M-245 (polyethylene glycol diacrylate, n is about 9), Aronix M-305 (pentaerythritol triacrylate), Aronix M-309 (trimethylolpropane triacrylate), Aronix M-315 (isocyanuric acid ethylene oxide-modified triacrylate), Aronix M-400 (a mixture of dipentaerythritol pentaacrylate and dipentaerythritol hexaacrylate-main component), Aronix M-450 (pentaerythritol tetraacrylate), Aronix M-8060 and Aronix M-8560 available from Toagosei Chemical Industry Co. Ltd.;

Viscoat #295 (trimethylolpropane triacrylate), Viscoat #300 (pentaerythritol triacrylate), Viscoat #360 (trimethylolpropane ethylene oxide-modified triacrylate) and Viscoat #400 (pentaerythritol tetraacrylate) available from Osaka Organic Chemical Industry Ltd.; and Kayarad TMPTA (trimethylolpropane triacrylate), Kayarad PET-30 (pentaerythritol triacrylate), Kayarad DPHA (a mixture of dipentaerythritol pentaacrylate and dipentaerythritol hexaacrylate-main component), Kayarad D-310 (dipentaerythritol pentaacrylate), Kayarad D-330 and Kayarad DPCA-60 available from Nippon Kayaku Co., Ltd.

Desirable examples in the invention among the compounds described above are polyfunctional acrylate having three or more functional groups such as trimethylolpropane triacrylate, pentaerythritol triacrylate, pentaerythritol tetraacrylate, dipentaerythritol pentaacrylate, dipentaerythritol hexaacrylate; Aronix M-305, Aronix #309, Aronix M-400 and Aronix M-450 available fromToagosei Chemical Industry Co., Ltd.; Viscoat #295, Viscoat #300, Viscoat #400 available from Osaka Organic Chemical Industry Ltd.; and Kayarad TMPTA, Kayarad DPHA, Kayarad D-310 and Kayarad PET-30 available from Nippon Kayaku Co., Ltd. Incidentally, these compounds can be used, alone, or a mixture of two or more of them.

The photosensitive polymer of the invention is formed on a substrate for its use, and thus it is required to have characteristics, which are necessary to an optical film or an optical display device as a material for use in a liquid crystal alignment film, such as an excellent orientation ability, adhesion to a substrate, application uniformity, chemical resistance, thermal resistance, permeability and gas barrier property. An additive can be used to give such characteristics.

The amounts of a variety of additives may be determined according to characteristics required. Desirable amounts are in the range of approximately 0.01% to approximately 10% by weight based on 100% by weight of the polymer of the invention.

The additive includes an acryl-based, styrene-based, polyethyleneimine-based or urethane-based polymer dispersing agent; an anionic, cationic, non-ionic or fluorine-based surfactant; a coating property-improving agent such as silicon resin or the like; an adhesion-improving agent such as a silane coupling agent or the like; an ultraviolet absorber such as alkoxybenzophenones; a deflocculating agent such as sodium polyacrylate; a thermal crosslinking agent such as oxirane compounds, melamine compounds and bisazido compounds; and an alkali-solubility accelerator such as organocarboxylic acids.

A photosensitizer can be used as an additive. A colorless photosensitizer and a triplet photosensitizer are desirable.

The photosensitizer includes aromatic nitro compounds, coumarins (7-diethylamino-4-methylcoumarin, 7-hydroxy-4-methylcoumarin), ketocoumarin, carbonylbiscoumarins, aromatic 2-hydroxyketones, amino-substituted aromatic 2-hydroxyketone, [2-hydroxybenzophenone, mono- or di-p-(dimethylamino)-2-hydroxybenzophenone)], acetophenone, anthraquinone, xanthone, thioxanthone, benzanthorone, thiazolines [2-benzoylmethylene-3-methyl-β-naphthothiazoline, 2-(β-naphthoylmethylene)-3-methylbenzothiazoline, 2-(α-naphthoylmethylene)-3-methylbenzothiazoline, 2-(4-biphenoylmethylene)-3-methylbenzothiazoline, 2-(β-naphthoylmethylene)-3-methyl-β-naphthothiazoline, 2-(4-biphenoylmethylene)-3-methyl-β-naphthothiazoline, 2-(p-fluorobenzoylmethylene)-3-methyl-β-naphthothiazoline)], oxazolines, [2-benzoylmethylene-3-methyl-β-naphtoxazoline, 2-(R-naphthoylmethylene)-3-methylbenzoxazoline, 2-α-naphthoylmethylene)-3-methylbenzoxazoline, 2-(4-biphenoylmethylene)-3-methylbenzoxazoline, 2-(R-naphthoylmethylene)-3-methyl-β-naphthoxazoline, 2-(4-biphenoylmethylene)-3-methyl-β-naphthoxazoline, 2-(p-fluorobenzoylmethylene)-3-methyl-β-naphthoxazoline)], benzothiazole, nitroanilines (m- or p-nitroaniline, 2,4,6-trinitroaniline), nitroacenaphthene, 5-nitroacenaphthene, 2-[(m-hydroxy-p-methoxy)styryl]benzothiazole, benzoin alkyl ether, N-alkylated phthalone, acetophenone ketal(2,2-dimethoxyphenylethanone), naphthalene, anthracene, 2-naphthalenemethanol, 2-naphthalenecarboxylic acid, 9-anthracenemethanol, 9-anthracenecarboxylic acid, benzopyran, azo indolizine and furocoumarin.

Desirable photosensitizers are aromatic 2-hydroxyketone (benzophenone), coumarin, ketocoumarin, carbonylbiscoumarin, acetophenone, anthraquinone, xanthone, thioxanthone and acetophenone ketal.

A photosensitizer having a polymerizable group can be used as a structural unit. The polymerizable group includes an acryloyl group, a methacryloyl group, a vinyl group, a maleimido group, the unsaturated group of itaconic acid [—$CH_2$—$C(=CH_2)$—] and so forth.

Specific examples will be shown below. The invention is not limited by these specific examples.

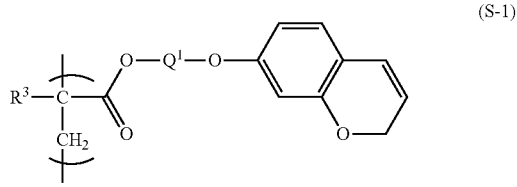
(S-1)

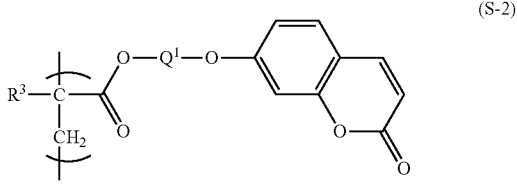
(S-2)

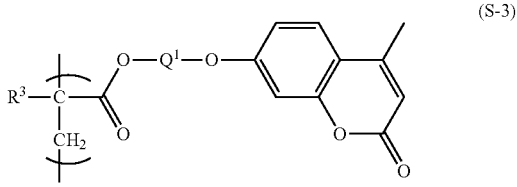
(S-3)

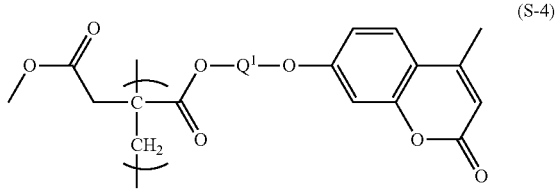
(S-4)

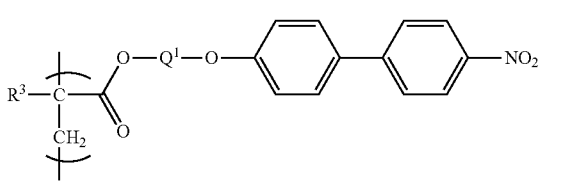
(S-5)

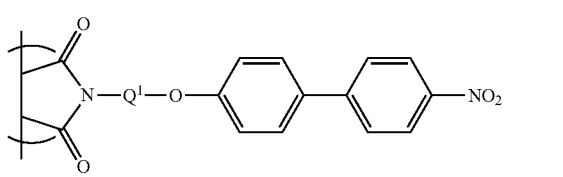
(S-6)

In these compounds, the definition of $Q^1$ and $R^3$ is the same with that of $Q^1$ and $R^3$ in formulas (M-1) and (M-2) described above.

A silane coupling agent can be used as an additive to improve adhesion to a substrate. Silane compounds, aluminum compounds and titanate compounds are used as a coupling agent. Specific examples include silane compounds such as 3-glycidoxypropyldimethylethoxysilane, 3-glycidoxypropylmethyldiethoxysilane and 3-glycidoxypropyltrimethoxysilane; aluminum compounds such as acetoalkoxyaluminumdiisopropylate; and titanate compounds such as tetraisopropylbis(dioctylphosphite)titanate.

A surfactant is used as an additive to improve wettability to a base substrate, leveling properties and coating properties. Silicon-based surfactants, acryl-based surfactants, fluorine-based surfactants and so forth are used as a surfactant. Specific examples include silicon-based surfactants such as Byk- 300, Byk-306, Byk-335, Byk-310, Byk-341, Byk-344 and Byk-370 available from BYK Additives & Instruments; acryl-based surfactants such as Byk-354, Byk-358 and Byk-361; and fluorine-based surfactants such as SC-101 available from Asahi Glass Co., Ltd. and such as EF-351 and EF-352 available from Tohkem Products Corporation.

The weight-average molecular weight of the photosensitive polymer having the structural unit represented by formula (3) is preferably in the range of approximately 1,000 to approximately 500,000, and more preferably in the range of approximately 1,000 to approximately 100,000. The weight-average molecular weight can be measured using gel permeation chromatography (GPC) in terms of polystyrene standards.

The method for the production of the photosensitive polymer having the structural unit represented by formula (3) is not especially limited and a conventional method used industrially is applicable. In specific, the photosensitive polymer can be produced by cationic polymerization, radical polymerization or anionic polymerization of the vinyl group of the compound (1). Among these, the radical polymerization is especially desirable in view of easy reaction control and so forth.

A known compound such as a thermal radical polymerization initiator and a photo-radical polymerization initiator can be used as a polymerization initiator for radical polymerization.

The thermal radical polymerization initiator is a compound that gives radicals when heated at its decomposition temperature or higher. Such a thermal radical polymerization initiator includes ketone peroxides (methyl ethyl ketone peroxide, cyclohexanone peroxide, and so forth), diacyl peroxides (acetyl peroxide, benzoyl peroxide, and so forth), hydroperoxides (hydrogen peroxide, tert-butyl hydroperoxide, cumene hydroperoxide, and so forth), dialkyl peroxides (di-tert-butyl peroxide, dicumyl peroxide, dilauroyl peroxide, and so forth), peroxy ketals (dibutylperoxy cyclohexane, and so forth), alkylperesters (peroxyneodecanoic acid-tert-butyl ester, peroxypivalic acid-tert-butyl ester, peroxy 2-ethylcyclohexanoic acid tert-amyl ester, and so forth), persulfates (potassium persulfate, sodium persulfate, ammonium persulfate, and so forth), azo compounds (azobisisobutyronitrile, and 2,2'-di(2-hydroxyethyl)azobisisobutyronitrile, and so forth). The thermal radical polymerization initiators may be used solely or in combination of two or more of them.

The photo-radical polymerization initiator may be a compound that initiates radical polymerization on irradiation with light, and is not especially limited. Such a photo-radical polymerization initiator includes benzophenone, Michler's ketone, 4,4'-bis(diethylamino)benzophenone, xanthone, thioxanthone, isopropylxanthone, 2,4-diethylthioxanthone, 2-ethylanthraquinone, acetophenone, 2-hydroxy-2-methylpropiophenone, 2-hydroxy-2-methyl-4'-isopropylpropiophenone, 1-hydroxycyclohexylphenylketone, isopropylbenzoin ether, isobutylbenzoin ether, 2,2-diethoxyacetophenone, 2,2-dimethoxy-2-phenylacetophenone, camphorquinone, benzanthorone, 2-methyl-1-[4-(methylthio)phenyl]-2-morpholinopropan-1-one, 2-benzyl-2-dimethylamino-1-(4-morpholinophenyl)-butanone-1, ethyl 4-dimethylaminobenzoate, isoamyl 4-dimethylaminobenzoate, 4,4'-di(t-butylperoxycarbonyl)benzophenone, 3,4,4'-tri(t-butylperoxycarbonyl)benzophenone, 2,4,6-trimethylbenzoyldiphenylphosphineoxide, 2-(4'-methoxystyryl)-4,6-bis(trichloromethyl)-s-triazine, 2-(3',4'-dimethoxystyryl)-4,6-bis(trichloromethyl)-s-triazine, 2-(2',4'-dimethoxystyryl)-4,6-bis(trichloromethyl)-s-triazine, 2-(2'-methoxystyryl)-4,6-bis(trichloromethyl)-s-triazine, 2-(4'-pentyloxystyryl)-4,6-bis(trichloromethyl)-s-triazine, 4-[p-N,N-di(ethoxycarbonylmethyl)]-2,6-di(trichloromethyl)-s-triazine, 1,3-bis(trichloromethyl)-5-(2'-chlorophenyl)-s-triazine, 1,3-bis(trichloromethyl)-5-(4'-methoxyphenyl)-s-triazine, 2-(p-dimethylaminostyryl)benzoxazole, 2-(p-dimethylaminostyryl)benzothiazole, 2-mercaptobenzothiazole, 3,3'-carbonylbis(7-diethylaminocoumarin), 2-(o-chlorophenyl)-4,4',5,5'-tetraphenyl-1,2'-biimidazole, 2,2'-bis(2-chlorophenyl)-4,4',5,5'-tetrakis(4-ethoxycarbonylphenyl)-1,2'-biimidazole, 2,2'-bis(2,4-dichlorophenyl)-4,4',5,5'-tetraphenyl-1,2'-biimidazole, 2,2'-bis(2,4-dibromophenyl)-4,4',5,5'-tetraphenyl-1,2'-biimidazole, 2,2'-bis(2,4,6-trichlorophenyl)-4,4',5,5'-tetraphenyl-1,2'-biimidazole, 3-(2-methyl-2-dimethylaminopropionyl)carbazole, 3,6-bis(2-methyl-2-morpholinopropionyl)-9-n-dodecylcarbazole, 1-hydroxycyclohexylphenylketone, bis(5-2,4-cyclopentadien-1-yl)-bis(2,6-difluoro-3-(1H-pyrrole-1-yl)-phenyl)titanium, 3,3',4,4'-tetra(t-butylperoxycarbonyl)benzophenone, 3,3',4,4'-tetra(t-hexylperoxycarbonyl)benzophenone, 3,3'-di(methoxycarbonyl)-4,4'-di(t-butylperoxycarbonyl)benzophenone, 3,4'-di(methoxycarbonyl)-4,3'-di(t-butylperoxycarbonyl)benzophenone, 4,4'-di(methoxycarbonyl)-3,3'-di(t-butylperoxycarbonyl)benzophenone, 2-(3-methyl-3H-benzothiazole-2-ylidene)-1-naphthalene-2-yl-ethan one and 2-(3-methyl-1,3-benzothiazole-2(3H)-ylidene)-1-(2-benzoyl)ethanone. These compounds can be used, alone, or a mixture of two or more of them.

A method of radical polymerization is not especially limited, and an emulsion polymerization method, a suspension polymerization method, a dispersion polymerization method, a precipitation polymerization method, a bulk polymerization method, a solution polymerization method or the like can be used. Another polymerization may be carried out in a similar manner, and the details are described in Takeshi Endo, "Koubunnsi no Gousei (Part 1/2)" (Synthesis of Polymers, in Japanese; Kodansha Ltd., 2010) or the like. The solution polymerization method, which is a general radical polymerization method, will be outlined below.

A solution polymerization is polymerization that is carried out in a solvent using an oil-soluble polymerization catalyst. The organic solvent can be arbitrary selected in the range that is suitable for the purpose and effect of the invention. The organic solvent is an organic compound that usually has the boiling point in the range of approximately 50° C. to approximately 200° C. under atmospheric pressure. It is desirable that the organic compound dissolves a monomer and reactive intermediates in the polymerization.

The organic solvent described above can be used if it does not have an inhibition effect on radical polymerization. Desirable organic solvent includes aromatic compounds such as benzene, toluene, xylene and ethylbenzene; aliphatic compounds such as pentane, hexane, heptane, octane, cyclohexane and cycloheptane; alcohols such as methanol, ethanol, 1-propanol, 2-propanol and ethylene glycol; ethers such as dibutyl ether, ethylene glycol monomethyl ether, ethylene glycol dimethyl ether, tetrahydrofuran and dioxane; ketones such as acetone, methyl ethyl ketone, methyl isobutyl ketone and cyclohexanone; and esters such as ethyl acetate, butyl acetate, amyl acetate and γ-butyrolactone. Incidentally, these solvents can be used, alone, or in combination of two or more of them.

Conditions for the solution polymerization are not especially limited. For example, it is desirable to heat for approximately 10 minutes to approximately 20 hours in the temperature range of approximately 50° C. to approximately 200° C. It is also desirable that inactive gas is purged not only during the solution polymerization but also before the solution polymerization in order to avoid the deactivation of the radicals generated.

The radical polymerization method using a chain transfer agent is especially effective for the adjustment of the molecular weight, the homogenization of molecular weight distribution or the enhancement in the polymerization of photosensitive polymer having the structural unit represented by formula (3). A polymer having a more uniform molecular distribution in a desirable range of molecular weights can thus be obtained.

The chain transfer agent includes mercaptanes such as β-mercaptopropionic acid, β-mercaptopropionic acid methyl ester, isopropylmercaptane, octylmercaptane, decylmercaptane, dodecylmercaptane, tert-dodecylmercaptane, octadecylmercaptane, thiophenol, p-nonylthiophenol, thiosalicylic acid and mercaptoacetic acid; polyhalogenated alkyl such as carbon tetrachloride, chloroform, butyl chloride, 1,1,1-trichloroethane and 1,1,1-tribromooctane; and less active monomers such as α-methylstyrene and α-methylstyrene dimer. The amount of the chain transfer agent is determined on the basis of its activity, a combination of monomers, and polymerization conditions such as a solvent, reaction temperature or the like. The amount of the chain transfer agent is usually in the range of approximately 0.01 mol % to approximately 50 mol % based on the total moles of the monomer used.

The photoaligning agent of the invention is used as a solution in which the photosensitive polymer is dissolved in an organic solvent. The liquid crystal alignment film of the invention is formed by application of the photoaligning agent to a substrate by known methods (for example, spin coating, gravure coating, reverse gravure coating, Mayer bar coating, die coating, reverse roll coating, fountain reverse roll coating, kiss roll coating, bar coating, knife coating, lip coating and resist coating), by removal of the organic solvent, and then by alignment treatment of the resulting coating film by irradiation with polarized light.

The liquid crystal alignment film of the invention is irradiated with light in one direction to the film in order to give orientation ability. The photosensitive polymer in the film is aligned by light, and thus liquid crystal alignment film exhibits orientation ability. In this case, X-rays, electron beams, ultraviolet light, visible rays or infrared light (heat rays) is used as light for irradiation, and ultraviolet light is especially desirable. The wavelength of ultraviolet light is preferably approximately 400 nm or less, and more preferably in the range of approximately 180 to approximately 360 nm. A low-pressure mercury lamp, a high pressure mercury lamp, an ultra high-pressure mercury lamp, a high intensity discharge lamp or a short-arc lamp is preferably used as a light source. Linearly polarized light is generally irradiated, and there are cases where the orientation ability is exhibited by the action of unpolarized light. Usage of linearly polarized light is especially desirable. The light dose is preferably in the range of approximately 10 mJ/cm$^2$ to approximately 20,000 mJ/cm$^2$, and most preferably in the range of approximately 20 mJ/cm$^2$ to approximately 5,000 mJ/cm$^2$.

The liquid crystal alignment film of the invention is prepared by applying the photoaligning agent including the photosensitive polymer and a variety of compounds added as requested, to a transparent substrate, and by aligning the photosensitive polymer under irradiation with light. The liquid crystal alignment film of the invention exhibits optical anisotropy caused by alignment of the photosensitive polymer.

An optical film can be obtained by using liquid crystal alignment film of the invention. The optical film of the invention means an optical compensation film, a phase retardation film and so forth, those of which realize an improvement of the contrast of a liquid crystal display device or an increase of the range of a viewing angle. The optical film generally has a substrate, an alignment film and an optically anisotropic layer. The optically anisotropic layer is prepared by applying a polymerizable liquid crystal composition including a polymerizable liquid crystal compound and a variety of compounds added as requested, to the alignment film, and by orienting molecules of the liquid crystal compound, and then by polymerizing them. The optically anisotropic layer exhibits optical anisotropy caused by the orientation of molecules of the liquid crystal compound.

It will be apparent to those skilled in the art that various modifications and variations can be made in the invention and specific examples provided herein without departing from the spirit or scope of the invention. Thus, it is intended that the invention covers the modifications and variations of this invention that come within the scope of any claims and their equivalents.

The following examples are for illustrative purposes only and are not intended, nor should they be interpreted to limit the scope of the invention.

EXAMPLES

The invention will be explained in detail by way of examples. The invention is not limited by these examples. The structure of a compound is confirmed by nuclear magnetic resonance spectroscopy, infrared spectroscopy, mass spectroscopy and so forth. The unit of the phase transition temperature is the degree Celsius (° C.), and C stands for crystals and I stands for an isotropic liquid phase. Methods for measuring physical properties were as follows.

Weight-Average Molecular Weight (Mw), Polydispersity Index (Mw/Mn)

Shimadzu Model LC-9A gel permeation chromatograph (GPC) made by Shimadzu Corporation and column Shodex GF-7M HQ made by Showa Denko K. K. were used. The eluent was DMF or THF, and the standard material was polystyrene whose molecular weight was known.

Orientation of Liquid Crystal Molecules

Orientation of liquid crystal molecules was confirmed by the following methods.

(1) Visual Observation

An anisotropic polymer formed on a liquid crystal alignment film-coated substrate was sandwiched between two polarizers that were arranged in crossed Nicols, and was observed. The substrate was rotated in the horizontal plane, and the bright and dark states were confirmed. An anisotropic polymer formed on a liquid crystal alignment film-coated substrate was observed with a polarizing microscope, and the presence or absence of alignment defects was confirmed.

(2) Measurement with a Polarimeter

An Optipro polarimeter made by Shintech, Inc. was used. An anisotropic polymer formed on a liquid crystal alignment film-coated substrate was irradiated with light of wavelength 550 nm. Retardation was measured as incident angle of light to the film surface decreased from 90 degrees. Retardation (delay in phase) is expressed as $\Delta n \times d$. The symbol $\Delta n$ is the value of optical anisotropy, and the symbol d is the thickness of a polymer film.

Measurement of Film Thickness

From an anisotropic polymer formed on a liquid crystal alignment film-coated substrate, two layers of the liquid crystal alignment film and the anisotropic polymer were cut off, and the thickness was measured with a surface profilometer (Alpha-Step IQ made by KLA-Tencor Corporation).

Evaluation of the Value of Optical Anisotropy (Δn)

Optical anisotropy was calculated from the value of retardation measured by the method described above and the value of film thickness using the equation of Δn=(retardation)/(film thickness).

Evaluation of Adhesion to a Substrate

An adhesive tape peel test was carried out according to a test method of the JIS standards "JIS-5400 8.5 adhesiveness (8.5.2 cross-cut tape test method), and was evaluated by the number of residual squares among one hundred squares. The substrate used was a TAC film which had been previously treated by a saponification process (made by Fujifilm Corporation; hereinafter, referred to as a saponificated TAC)

Photopolymerization Conditions of a Polymerizable Liquid Crystal Composition

An irradiance of 90 mW/cm$^2$ (365 nm) was irradiated for 30 seconds using a 500 W-ultra high-pressure mercury lamp (made by Ushio, Inc.) at room temperature under an atmosphere of nitrogen or in air.

Example 1

The compound (1-1-4) was prepared in the following way.

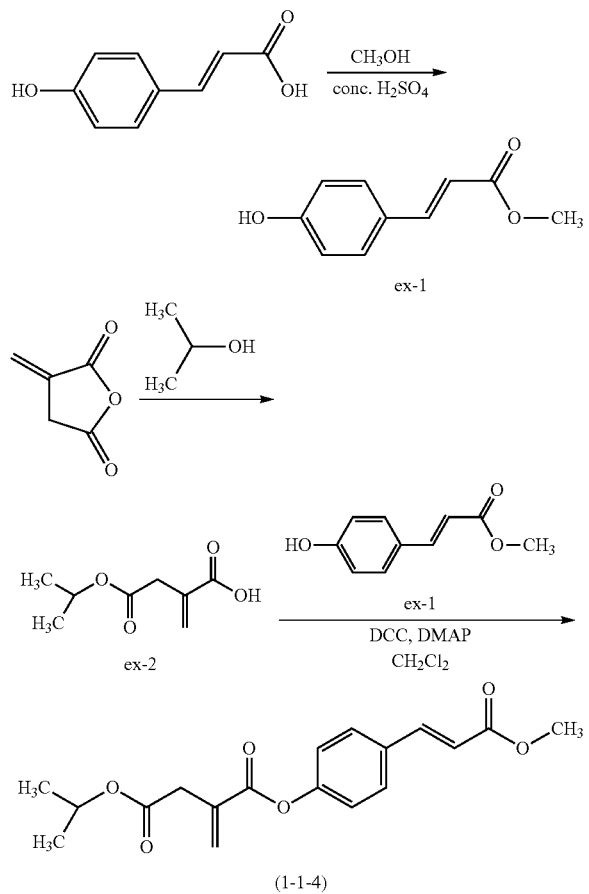

(1-1-4)

First Step:

trans-Coumaric acid (400 g) was added to methanol (1,200 ml) and concentrated sulfuric acid (10 g) was added dropwise, and the mixture was heated under reflux with stirring for 5 hours. After the reaction mixture had been cooled to room temperature, the methanol was distilled off under reduced pressure. The resulting residue was poured into ice-water (2,000 ml), and the mixture was extracted with ethyl acetate (2,000 ml). The combined organic layers were washed with a saturated aqueous solution of sodium hydrogencarbonate and water, and dried over anhydrous magnesium sulfate. The ethyl acetate was distilled off under reduced pressure, and the resulting residue was recrystallized from ethanol to give the compound (ex-1) (280 g).

Second Step:

Itaconic acid anhydride (250 g) was added to isopropyl alcohol (150 ml), and the solution was heated at 100° C. with stirring under an atmosphere of nitrogen for 6 hours. After the reaction mixture had been cooled to room temperature, it was distilled to give the compound (ex-2) (200 g).

Final Step:

The compound (ex-1) (20 g), the compound (ex-2) (19 g) and 4-dimethylaminopyridine (DMAP; 2.7 g) were added to dichloromethane (200 ml), and the mixture was stirred with cooling under an atmosphere of nitrogen. 1,3-Dicyclohexylcarbodiimide (DCC; 24 g) in dichloromethane (50 ml) was added. After the addition, the stirring was continued at room temperature for 16 hours. Precipitates were filtered off, and the filtrate was washed with water and dried over anhydrous magnesium sulfate. The dichloromethane was distilled off under reduced pressure and the residue was purified by column chromatography (silica gel, eluent: toluene/ethyl acetate=8/1 by volume) and then by recrystallization from methanol to give the compound (1-1-4) (28 g).

The phase transition temperature and the NMR analysis data of the resulting compound (1-1-4) were as follows.

Phase transition temperature: C 64 I.

$^1$H-NMR (CDCl$_3$; δ ppm): 7.68 (d, 1H), 7.55 (d, 2H), 7.16 (d, 2H), 6.55 (s, 1H), 6.41 (d, 1H), 5.90 (s, 1H), 5.08-5.01 (m, 1H), 3.81 (s, 3H), 3.42 (s, 2H), 1.25 (s, 3H) and 1.24 (s, 3H).

Example 2

The compound (1-1-1) was prepared in the following way.

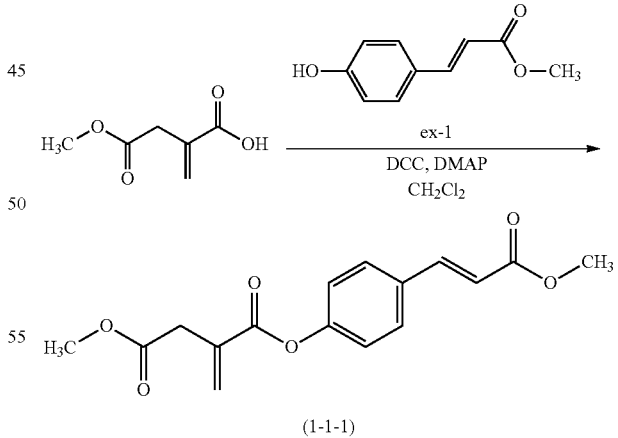

(1-1-1)

The compound (ex-1) (31 g), monomethylitaconic acid (25 g) and DMAP (4.2 g) were added to dichloromethane (200 ml), and the mixture was stirred with cooling under an atmosphere of nitrogen. DCC (37.6 g) in dichloromethane (80 ml) was added dropwise. After the addition, the stirring was continued at room temperature for 16 hours. Precipitates were filtered off, and the filtrate was washed with water and dried over anhydrous magnesium sulfate. The dichloromethane was distilled off under reduced pressure and the residue was purified by column chromatography (silica gel, eluent: toluene/ethyl acetate=8/1 by volume), and then by recrystallization from methanol to give the compound (1-1-1) (42 g).

The phase transition temperature and the NMR analysis data of the resulting compound (1-1-1) were as follows.

Phase transition temperature: C 80 I.

$^1$H-NMR (CDCl$_3$; δ ppm): 7.69 (d, 1H), 7.55 (d, 2H), 7.17 (d, 2H), 6.58 (s, 1H), 6.41 (d, 1H), 5.93 (s, 1H), 3.81 (s, 3H), 3.73 (s, 3H) and 3.48 (s, 2H).

Example 3

The compound (1-1-7) was prepared in the following way.

The compound (ex-1) (27.4 g), itaconic acid (10 g) and DMAP (3.8 g) were added to dichloromethane (200 ml), and the mixture was stirred with cooling under an atmosphere of nitrogen. DCC (33.3 g) in dichloromethane (70 ml) was added dropwise. After the addition, the stirring was continued at room temperature for 16 hours. Precipitates were filtered off, and the filtrate was washed with water and dried over anhydrous magnesium sulfate. The dichloromethane was distilled off under reduced pressure and the residue was purified by column chromatography (silica gel, eluent: toluene/ethyl acetate=4/1 by volume), and then by recrystallization from toluene to give the compound (1-1-7) (7 g).

The phase transition temperature and the NMR analysis data of the resulting compound (1-1-7) were as follows.

Phase transition temperature: C 131 I.

$^1$H-NMR (CDCl$_3$; δ ppm): 7.69 (d, 1H), 7.66 (d, 1H), 7.57 (d, 2H), 7.53 (d, 2H), 7.18 (d, 2H), 7.13 (d, 2H), 6.66 (s, 1H), 6.43 (d, 1H), 6.39 (d, 1H), 6.05 (s, 1H), 3.81 (m, 6H) and 3.71 (s, 2H).

Example 4

The compound (1-1-11) was prepared in the following way.

First Step:

The compound (ex-1) (40 g) and sodium hydroxide (9.9 g) were added to N,N-dimethylformamide (DMF; 400 ml), and the mixture was heated at 60° C. with stirring under an atmosphere of nitrogen. 2-Bromoethanol (30.9 g) was added dropwise. After the addition, the stirring was continued at 80° C. for 8 hours. Precipitates were filtered off, and water (800 ml) was added to the filtrate, which was extracted with ethyl acetate (800 ml). The combined organic layers were washed with a saturated aqueous solution of sodium hydrogencarbonate and water, and dried over anhydrous magnesium sulfate. The ethyl acetate was distilled off under reduced pressure, and the residue was purified by column chromatography (silica gel, eluent: toluene/ethyl acetate=4/1 by volume) and then by recrystallization from toluene to give the compound (ex-2) (31.9 g).

Final Step:

The compound (ex-2) (15 g), monomethylitaconic acid (9.7 g) and DMAP (1.7 g) were added to dichloromethane (100 ml), and the mixture was stirred with cooling under an atmosphere of nitrogen. DCC (14.6 g) in dichloromethane (50 ml) was added dropwise. After the addition, the stirring was continued at room temperature for 16 hours. Precipitates were filtered off, and the filtrate was washed with water and dried over anhydrous magnesium sulfate. The dichloromethane was distilled off under reduced pressure and the residue was purified by column chromatography (silica gel, eluent: toluene/ethyl acetate=6/1 by volume), and then by recrystallization from methanol to give the compound (1-1-11) (16.7 g).

The phase transition temperature and the NMR analysis data of the resulting compound (1-1-11) were as follows.

Phase transition temperature: C 50 I.

$^1$H-NMR (CDCl$_3$; δ ppm): 7.65 (d, 1H), 7.48 (d, 2H), 6.92 (d, 2H), 6.38 (s, 1H), 6.33 (d, 1H), 5.76 (s, 1H), 4.53 (t, 2H), 4.24 (t, 2H), 3.80 (s, 3H), 3.67 (s, 3H) and 3.36 (s, 2H).

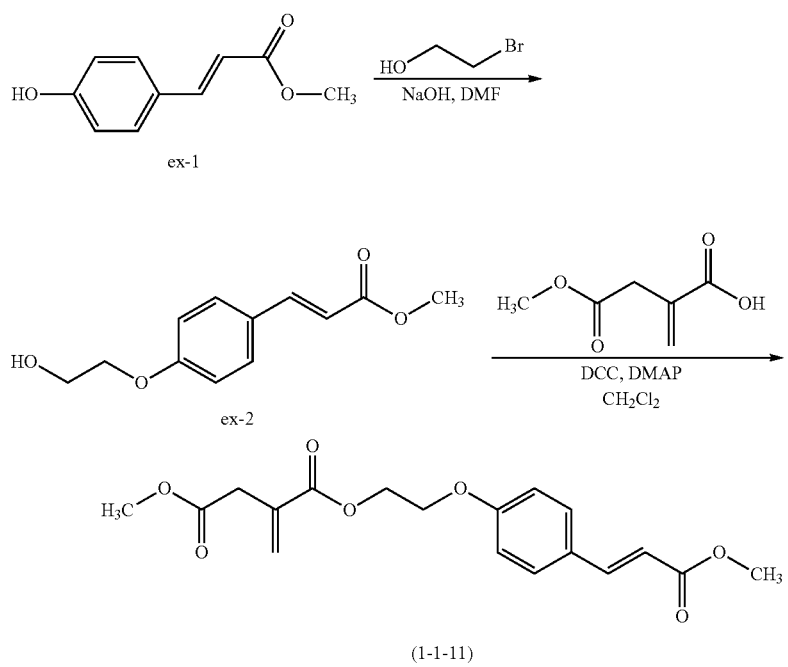

Example 5

The compound (1-2-2) was prepared in the following way.

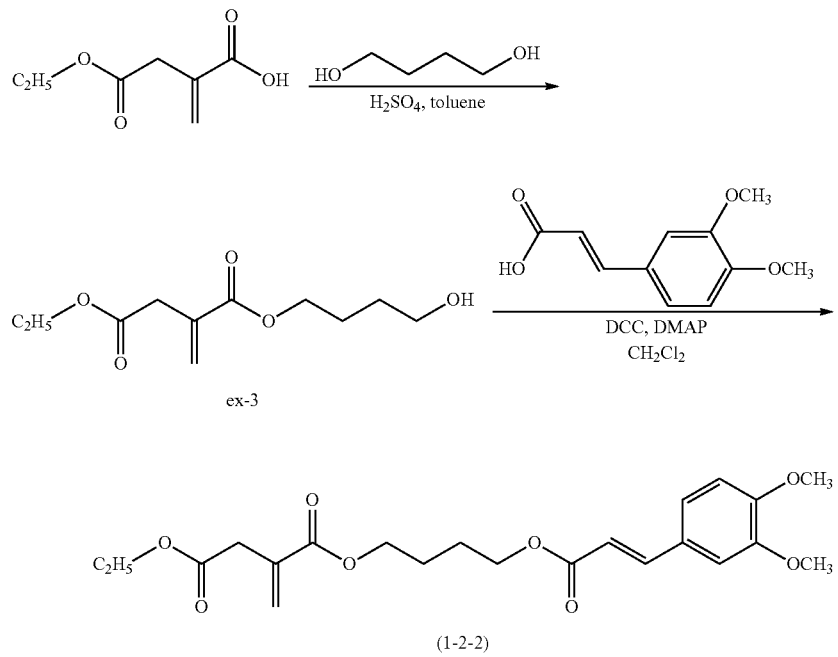

First Step:

Monoethylitaconic acid (40 g) and 1,4-butanediol (68.4 g) were added to toluene (160 ml), and three drops of concentrated sulfuric acid was added. The mixture was heated under reflux with stirring for 16 hours, and the water formed was removed with a Dean-Stark apparatus. Water was added to the reaction mixture to separate an organic layer, and the organic layer was dried over anhydrous magnesium sulfate. The toluene was distilled off under reduced pressure. Distillation gave the compound (ex-3) (29.7 g).

Final Step:

The compound (ex-3) (10 g), 3,4-dimethoxycinnamic acid (9 g) and DMAP (1.1 g) were added to dichloromethane (100 ml), and the mixture was stirred with cooling under an atmosphere of nitrogen. DCC (9.4 g) in dichloromethane (30 ml) was added dropwise. After the addition, the stirring was continued at room temperature for 16 hours. Precipitates were filtered off, and the filtrate was washed with water and dried over anhydrous magnesium sulfate. The dichloromethane was distilled off under reduced pressure and the residue was purified by column chromatography (silica gel, eluent: toluene/ethyl acetate=8/1 by volume), and then by recrystallization from methanol to give the compound (1-2-2) (11.4 g).

The phase transition temperature and the NMR analysis data of the resulting compound (1-2-2) were as follows.

Phase transition temperature: C 39 I.

$^1$H-NMR (CDCl$_3$; δ ppm): 7.51 (d, 1H), 7.48 (s, 1H), 7.41 (d, 1H), 7.22 (d, 1H), 6.38 (s, 1H), 5.98 (s, 1H), 5.32 (s, 1H), 4.34-4.30 (m, 2H), 4.11 (t, 2H), 4.07 (t, 2H), 3.78 (s, 6H), 3.29 (s, 2H), 1.58-1.49 (m, 4H) and 1.31 (t, 3H).

Example 6

The compound (1-1-13) was prepared in the following way.

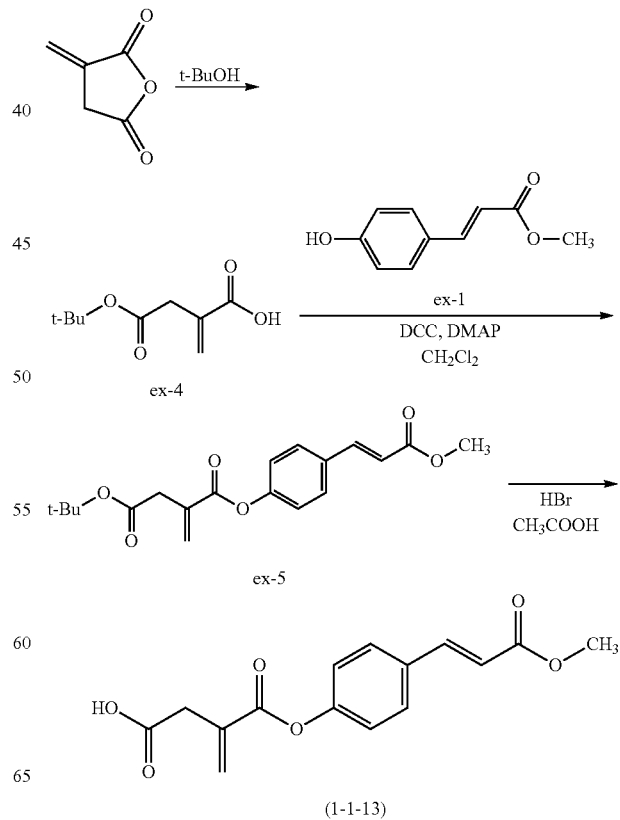

First Step:

Itaconic acid anhydride (100 g) was added to t-butanol (200 ml), and the mixture was heated to 100° C. with stirring for 6 hours under an atmosphere of nitrogen. After the reaction mixture had been cooled to room temperature, distillation gave the compound (ex-4) (128 g).

Second Step:

The compound (ex-1) (20 g), the compound (ex-4) (21 g) and DMAP (2.3 g) were added to dichloromethane (200 ml), and the mixture was stirred with cooling under an atmosphere of nitrogen. DCC (14.4 g) in dichloromethane (50 ml) was added dropwise. After the addition, the stirring was continued at room temperature for 16 hours. Precipitates were filtered off, and the filtrate was washed with water and dried over anhydrous magnesium sulfate. The dichloromethane was distilled off under reduced pressure and the residue was purified by column chromatography (silica gel, eluent: toluene/ethyl acetate=4/1 by volume), and then by recrystallization from methanol to give the compound (ex-5) (24.7 g).

added dropwise. After the addition, the mixture was heated under reflux with stirring for 4 hours. Water (1,000 ml) was added to the reaction mixture, which was extracted with ethyl acetate (1,000 ml). The combined organic layers were washed with water and dried over anhydrous magnesium sulfate. The ethyl acetate was distilled off under reduced pressure, and the residue was recrystallized from ethanol to give the compound (1-1-13) (11.8 g).

The phase transition temperature and the NMR analysis data of the resulting compound (1-1-13) were as follows.

Phase transition temperature: C 127 I.

$^1$H-NMR (DMSO; δ ppm): 12.1 (s, 1H), 7.78 (d, 1H), 7.57 (d, 2H), 7.17 (d, 2H), 6.59 (s, 1H), 6.51 (d, 1H), 5.93 (s, 1H), 3.82 (s, 3H) and 3.47 (s, 2H).

Example 7

The compound (1-1-14) was prepared in the following way.

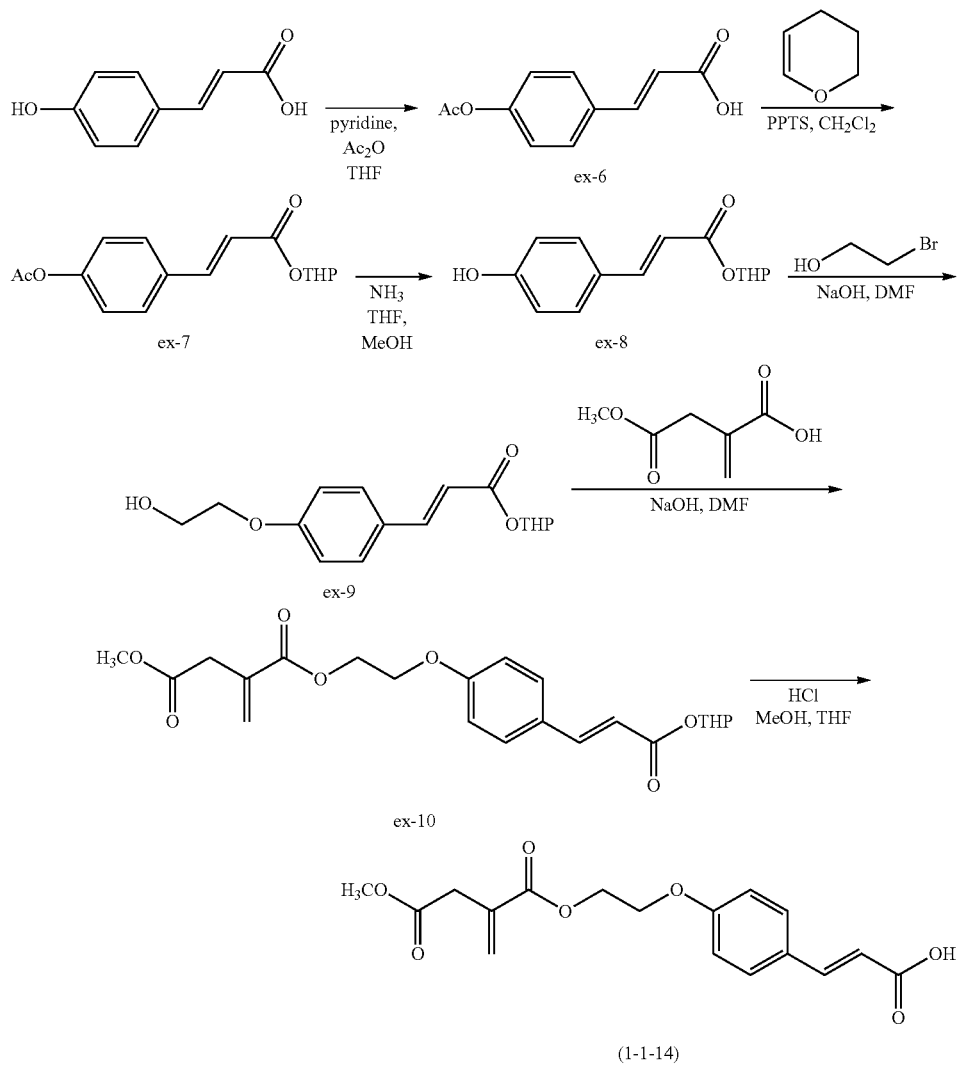

Final Step:

The compound (ex-5) (24.7 g) was to acetic acid (500 ml), and the mixture was heated to 100° C. with stirring under an atmosphere of nitrogen. Hydrobromic acid (47%; 25 ml) was First Step:

trans-Coumaric acid (100 g) and pyridine (60 g) were added to tetrahydrofuran (THF; 1,000 ml), and the mixture was stirred with cooling under an atmosphere of nitrogen.

Acetic anhydride (75 g) was added dropwise. After the addition, the stirring was continued at room temperature for 4 hours. Deposits were filtered off, and washed with toluene to give the compound (ex-6) (68 g).

Second Step:

The compound (ex-6) (30 g), 3,4-dihydro-2H-pyran (15 g) and pyridinium p-toluenesulfonic acid (PPTS; 3.6 g) were added to dichloromethane (600 ml), and the mixture was stirred at room temperature for 8 hours under an atmosphere of nitrogen. A saturated aqueous solution of sodium hydrogencarbonate was added to the reaction mixture, which was extracted. The combined organic layers were washed with water and dried over anhydrous magnesium sulfate. The dichloromethane was distilled off under reduced pressure, and the residue was vacuum dried to give a colorless oil of the compound (ex-7) (39 g).

Third Step:

The compound (ex-7) (39 g) was added to a mixture of THF (300 ml) and methanol (300 ml), and the mixture was stirred with cooling under an atmosphere of nitrogen. An aqueous solution of ammonia (28%; 18 ml) was added dropwise. After the addition, the stirring was continued at room temperature for 8 hours. The THF and methanol was distilled off under reduced pressure, and water (500 ml) was added to the residue, which was extracted with ethyl acetate (500 ml). The combined organic layers were washed with water and dried over anhydrous magnesium sulfate. The ethyl acetate was distilled off under reduced pressure, and the residue was recrystallized from heptane to give the compound (ex-8) (18.7 g).

Fourth Step:

The compound (ex-8) (18.7 g) and sodium hydroxide (3.3 g) were added to DMF (200 ml), and the mixture was heated at 60° C. with stirring under an atmosphere of nitrogen. 2-Bromoethanol (11.3 g) was added dropwise. After the addition, the stirring was continued at 80° C. for 8 hours. Precipitates were filtered off, and water (800 ml) was added to the filtrate, which was extracted with ethyl acetate (800 ml). The combined organic layers were washed with a saturated aqueous solution of sodium hydrogencarbonate and water, and dried over anhydrous magnesium sulfate. The ethyl acetate was distilled off under reduced pressure, and the residue was recrystallized from heptane to give the compound (ex-9) (15.6 g).

Fifth Step:

The compound (ex-9) (15.6 g), monomethylitaconic acid (8.5 g) and DMAP (0.7 g) were added to dichloromethane (160 ml), and the mixture was stirred with cooling under an atmosphere of nitrogen. DCC (11.6 g) in dichloromethane (30 ml) was added dropwise. After the addition, the stirring was continued at room temperature for 16 hours. Precipitates were filtered off, and the filtrate was washed with water and dried over anhydrous magnesium sulfate. The dichloromethane was distilled off under reduced pressure, and the residue was recrystallized from methanol to give the compound (ex-9) (13.6 g).

Final Step:

The compound (ex-9) (13.6 g) was added to a mixture of THF (150 ml) and methanol (150 ml), and the mixture was stirred with cooling under an atmosphere of nitrogen. 6N-Hydrochloric acid (20 ml) was added dropwise. After the addition, the stirring was continued at room temperature for 4 hours. Water (500 ml) was added to the reaction mixture, which was extracted with ethyl acetate (500 ml). The combined organic layers were washed with water and dried over anhydrous magnesium sulfate. The ethyl acetate was distilled off under reduced pressure, and the residue was recrystallized from ethanol to give the compound (1-1-14) (8 g).

The phase transition temperature and the NMR analysis data of the resulting compound (1-1-14) were as follows.

Phase transition temperature: C 138 I.

$^1$H-NMR (DMSO; δ ppm): 13.0 (s, 1H), 7.71 (d, 1H), 7.48 (d, 2H), 6.87 (d, 2H), 6.51 (s, 1H), 6.32 (d, 1H), 5.74 (s, 1H), 4.53 (t, 2H), 4.24 (t, 2H), 3.80 (s, 3H) and 3.35 (s, 2H).

Example 8

A copolymerization polymer of the compound (1-1-4) and the compound (M-1-2) were prepared in the following way.

The compound (1-1-4) (2.5 g), the compound (M-1-2) (2.5 g) and azobisisobutyronitrile (AIBN; 0.3 g) were added to THF (40 ml), and the mixture was heated under reflux with stirring for 10 hours under an atmosphere of nitrogen. The reaction mixture was poured into methanol to reprecipitate. Crystals were filtered, and dried to give the polymer (P-1) (4.3 g).

The resulting polymer had Mw of 6,400 and Mw/Mn of 2.3.

The compound (M-1-2) was prepared according to the method described in JP 4,011,652 B2 (2007).

Example 9

A copolymerization polymer of the compound (1-1-11) and the compound (M-1-2) were prepared in the following way.

The compound (1-1-11) (0.5 g), the compound (M-1-2) (4.5 g) and AIBN (0.04 g) were added to THF (40 ml), the mixture was heated under reflux with stirring for 10 hours under an atmosphere of nitrogen. The reaction mixture was poured into methanol to reprecipitate. Crystals were filtered, and dried to give the polymer (P-2) (4.7 g).

The resulting polymer had Mw of 57,200 and Mw/Mn of 2.9.

Example 10

A copolymerization polymer of the compound (1-1-7), the compound (M-1-1) and the compound (S-5-1) was prepared in the following way.

The compound (1-1-7) (2.5 g), the compound (M-1-1) (2.5 g), the compound (S-5-1) (0.2 g) and AIBN (0.1 g) were added to THF (40 ml), and the mixture was heated under reflux with stirring for 10 hours under an atmosphere of nitrogen. The reaction mixture was poured into methanol to reprecipitate. Crystals were filtered, and dried to give the polymer (P-3) (3.2 g).

The resulting polymer had Mw of 22,800 and Mw/Mn of 2.5.

The compound (M-1-1) was prepared according to the method described in JP 4,011,652 B2 (2007).

The compound (S-5-1) was prepared according to the method described in JP 2002-226429 A (2002).

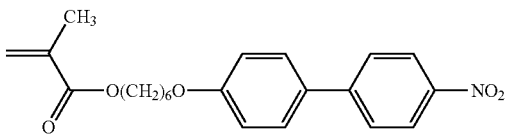

(S-5-1)

Example 11

A copolymerization polymer of the compound (1-2-2), the compound (M-2-1) and 4-hydroxybutyl metacrylate was prepared in the following way.

The compound (1-2-2) (4.0 g), the compound (M-2-1) (1.0 g), 4-hydroxybutyl metacrylate (0.5 g) and AIBN (0.6 g) were added to THF (40 ml), and the mixture was heated under reflux with stirring for 10 hours under an atmosphere of nitrogen. The reaction mixture was poured into methanol to reprecipitate. Crystals were filtered, and dried to give the polymer (P-4) (2.8 g).

The resulting polymer had Mw of 4,700 and Mw/Mn of 3.5.

Example 12

The following copolymers (P-5) to (P-10) were prepared according to the method described in Example 8 and Example 9.

| Polymer | Compound and its amount (g) | Compound and its amount (g) | Yield (g) | Mw | Mw/Mn |
|---|---|---|---|---|---|
| P-5 | 1-1-1; 4.0 | M-1-12; 1.0 | 3.1 | 18000 | 3.1 |
| P-6 | 1-1-1; 2.5 | M-1-2; 2.5 | 4.2 | 17000 | 2.7 |
| P-7 | 1-1-4; 2.5 | M-1-2; 2.5 | 3.7 | 21000 | 2.8 |
| P-8 | 1-1-4; 0.05 | M-1-2; 4.95 | 4.0 | 23000 | 2.6 |
| P-9 | 1-1-11; 2.5 | M-1-2; 2.5 | 4.4 | 22000 | 2.5 |
| P-10 | 1-1-11; 0.25 | M-1-11; 4.75 | 4.1 | 23000 | 2.7 |

The compound (M-1-11) was prepared according to the method described in JP 2005-528486 A. The compound (M-1-12) was prepared according to the method described in Makromolekulare Chemie, 1989, 190(6), 1369-77.

Comparative Example 1

The compound (M-1-2) (5.0 g) and azobisisobutyronitrile (AIBN) (0.1 g) were added to THF (40 ml), and mixture was heated under reflux with stirring for 10 hours under an atmosphere of nitrogen. The reaction mixture was poured into methanol to precipitate. Crystals was filtered and dried to give the polymer (P-11) (4.2 g). The polymer had Mw of 25,000, and Mw/Mn of 2.8.

Comparative Example 2

The compound (M-1-11) (5.0 g) and azobisisobutyronitrile (AIBN) (0.1 g) were added to THF (40 ml), and the mixture was heated under reflux with stirring for 10 hours under an atmosphere of nitrogen. The reaction mixture was poured into methanol to precipitate. Crystals was filtered and dried to give the polymer (P-12) (4.0 g). The polymer had Mw of 23,000 and Mw/Mn of 2.9.

Example 13

The polymer (P-1) was dissolved in a mixed solvent of cyclopentanone: propylene glycol monomethyl ether acetate (PGMEA)=7:3 by weight, to give a solution in which the solid content was 7% by weight. The solution was filtered with a membrane filter having a pore size of 0.45 μm to give the photoaligning agent (H-1).

Example 14

The photoaligning agent (H-2) was prepared according to the method described in Example 13, except that the polymer (P-2) was used instead of the polymer (P-1).

Example 15

The photoaligning agent (H-3) was prepared according to the method described in Example 13, except that the polymer (P-3) was used instead of the polymer (P-1).

Example 16

The photoaligning agents (H-4) to (H-10) were prepared according to the method described in Example 13, except that the polymers (P-4) to (P-10) respectively were used instead of the polymer (P-1).

Comparative Example 3

The photoaligning agent (H-11) was prepared according to the method described in Example 13, except that the polymer (P-11) was used instead of the polymer (P-1).

Comparative Example 4

The photoaligning agent (H-12) was prepared according to the method described in Example 13, except that the polymer (P-12) was used instead of the polymer (P-1).

Example 17

Preparation of the Liquid Crystal Alignment Film (F-1)

The photoaligning agent (H-1) was applied to the surface of a glass substrate using a spin coater. In this case, the coating properties were excellent. This substrate was heated at 80° C. for 3 minutes, and the removal of the mixed solvent gave a coating film. Irradiation of the coating film with linearly polarized ultraviolet light at a wavelength of around 313 nm, in an amount of 1.0 J/cm$^2$ with an ultra high-pressure mercury lamp (made by Ushio, Inc.), from the direction of 90 degrees against the surface of the coating, gave the liquid crystal alignment film (F-1).

Next, low molecular weight-liquid crystals JC-5100XX (Chisso Corporation/JNC Corporation) was sandwiched between two of the photoalignment film (F-1) so that the coating films were contacted to the liquid crystals, and so that the polarization axis directions in linearly polarized light were the same (roughly parallel) during light alignment in order to give the same directions of liquid crystal orientation according to two photo-aligned film. The cell was heated on a hot plate at 110° C. for 30 seconds, and then allowed to come to room temperature. The cell was sandwiched between two polarizers that were arranged in crossed Nicols, and rotated in the horizontal plane. The field became alternately light and dark, by which homogeneous alignment was confirmed.

Example 18

The liquid crystal alignment film (F-2) was obtained according to the method described in Example 17, except that the photoaligning agent (H-2) was used instead of the photoaligning agent (H-1).

Example 19

The liquid crystal alignment film (F-3) was obtained according to the method described in Example 17, except that the photoaligning agent (H-3) was used instead of the photoaligning agent (H-1).

Example 20

The liquid crystal alignment films (F-4) to (F-10) were obtained according to the method described in Example 17, except that the photoaligning agents (H-4) to (H-10) respectively were used instead of the photoaligning agent (H-1).

Example 21

The photoaligning agent (H-1) was applied to the surface of a glass substrate using a spin coater. In this case, the coating properties were excellent. This substrate was heated at 80° C. for 3 minutes, and the removal of the mixed solvent gave a coating film. Irradiation of the coating film with linearly polarized ultraviolet light at a wavelength of around 313 nm, in an amount of 0.03 J/cm$^2$ from an ultra high-pressure mercury lamp, in the direction of 90 degrees from the surface of the coating, gave the liquid crystal alignment film (F-1A).

Example 22

The liquid crystal alignment films (F-2A), (F-5A) to (F-10A) were obtained according to the method described in Example 21, except that the photoaligning agents (H-2), (H-5) to (H-10) respectively were used instead of the photoaligning agent (H-1).

Comparative Example 5

The liquid crystal alignment film (F-11) was obtained according to the method described in Example 17, except that the photoaligning agent (H-11) was used instead of the photoaligning agent (H-1).

Comparative Example 6

The liquid crystal alignment film (F-11A) was obtained according to the method described in Example 21, except that the photoaligning agent (H-11) was used instead of the photoaligning agent (H-1).

Comparative Example 7

The liquid crystal alignment film (F-12) was obtained according to the method described in Example 17, except that the photoaligning agent (H-12) was used instead of the photoaligning agent (H-1).

Example 23

Preparation of the Polymerizable Liquid Crystal Composition (1)

Two compounds of the compound (LC-1) and the compound (LC-2) were mixed in the ratio of 50:50 (weight ratio) to give the composition, which is referred to as MIX1. A fluorine-based nonionic surfactant (Neos Company Limited, trade name: Futergent FTX-218) at the weight ratio of 0.002 and a polymerization initiator Irgacure 907 (BASF Japan Ltd.) at the weight ratio of 0.06 were added on the basis of the total weight of the composition MIX1. A mixed solvent of cyclopentanone and PGMEA was added to the composition at the ratio of 1:1 (weight ratio) to give the polymerizable liquid crystal composition (1) in which the ratio of the solvent was 80% by weight.

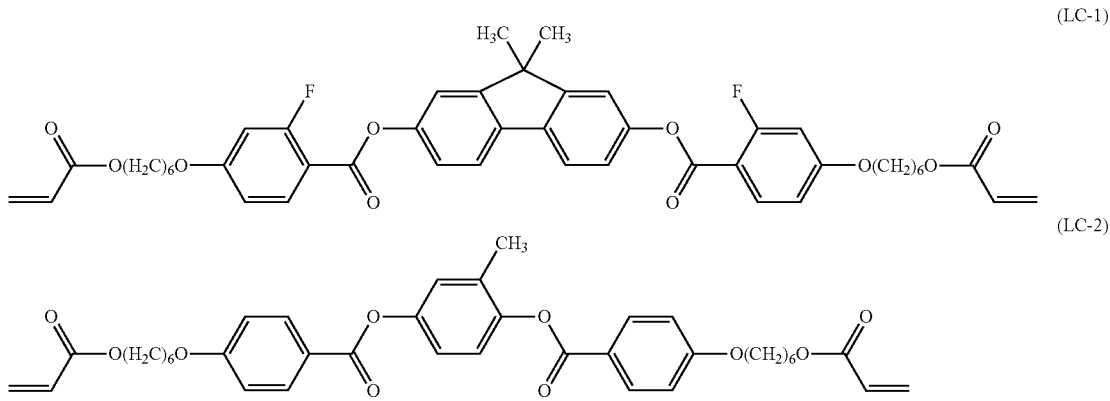

Specific synthetic method for the compound (LC-1) and the compound (LC-2) described above will be explained. The compound (LC-1) was prepared according to the method described in JP 2006-307150 A (2000). The compound (LC-2) was prepared according to the method described in JP S63-064029 A (1988).

Example 24

Formation of an Optical Film

The polymerizable liquid crystal composition (1) was applied to the surface of the liquid crystal alignment film (F-1) prepared in Example 15 using a spin coater. The substrate was heated at 80° C. for 3 minutes, and then cooled at room temperature for 3 minutes. The coating film from which the solvent had been removed was polymerized in air by irradiation of ultraviolet light to give an optical film, in which orientation of liquid crystals was fixed. It was confirmed that the optical film had no alignment defects and had a uniform alignment, when observed with a polarizing microscope. It was confirmed by measuring the retardation of the optical film that the optical film had homogeneous alignment.

Example 25

An optical film was obtained according to the method described in Example 24, except that the liquid crystal alignment film (F-2) was used instead of the liquid crystal alignment film (F-1). It was confirmed that the optical film had no alignment defects and had a uniform alignment, when observed with a polarizing microscope. It was confirmed by measuring the retardation of the optical film that the optical film had homogeneous alignment.

Example 26

An optical film was obtained according to the method described in Example 24, except that the liquid crystal alignment film (F-3) was used instead of the liquid crystal alignment film (F-1). It was confirmed that the optical film had no alignment defects and had a uniform alignment, when observed with a polarizing microscope. It was confirmed by measuring the retardation of the optical film that the optical film had homogeneous alignment.

Example 27

Optical films using the liquid crystal alignment films (F-3) to (F-10), (F-1A), (F-2A), and (F-5A) to (F-10A) were obtained according to the method described in Example 24. These optical films were observed with the polarizing microscope. The results are shown in Table 1 below.

Comparative Example 8

Optical films using the liquid crystal alignment films (F-11), (F-11A) and (F-12) were obtained according to the method described in Example 24. These optical films were observed with the polarizing microscope. The results are shown in Table 1 below.

TABLE 1

|  | Liquid crystal alignment film used | Alignment | Alignment defects |
|---|---|---|---|
| Example 27 | F-3 | homogeneous alignment | none |
|  | F-4 | homogeneous alignment | none |
|  | F-5 | homogeneous alignment | none |
|  | F-6 | homogeneous alignment | none |
|  | F-7 | homogeneous alignment | none |
|  | F-8 | homogeneous alignment | none |
|  | F-9 | homogeneous alignment | none |
|  | F-10 | homogeneous alignment | none |
|  | F-1A | homogeneous alignment | none |
|  | F-2A | homogeneous alignment | none |
|  | F-5A | homogeneous alignment | none |
|  | F-6A | homogeneous alignment | none |
|  | F-7A | homogeneous alignment | none |
|  | F-8A | homogeneous alignment | none |
|  | F-9A | homogeneous alignment | none |
|  | F-10A | homogeneous alignment | none |
| Comparative example 8 | F-11 | homogeneous alignment | none |
|  | F-11A | homogeneous alignment | present |
|  | F-12 | homogeneous alignment | present |

It was found, by the comparison of Example 27 with Example 5, that the photoalignment film of the invention had a high orientation ability with a high sensitivity.

Example 28

Preparation of the Liquid Crystal Alignment Film (FA-1)

The photoaligning agent (H-6) was applied to the surface of a TAC film which had been previously treated by a saponification process using a spin coater. In this case, the coating properties were excellent. This film was heated at 80° C. for 3 minutes, and the removal of the mixed solvent gave a coating film. Irradiation of the coating film with linearly polarized ultraviolet light at a wavelength of around 313 nm, in an amount of 0.3 J/cm$^2$ from an ultra high-pressure mercury lamp, in the direction of 90 degrees from the surface of the coating, gave the liquid crystal alignment film (FA-1).

Example 29

The liquid crystal alignment films (FA-2) to (FA-4) were obtained according to the method described in Example 28, except that the photoaligning agents (H-7) to (H-9) respectively were used instead of the photoaligning agent (H-6).

Comparative Example 9

The liquid crystal alignment film (FA-5) was obtained according to the method described in Example 28, except that the photoaligning agent (H-11) was used instead of the photoaligning agent (H-6).

The results of the evaluation of the adhesive tape peel test for the photoaligning agent (FA-1) to (FA-5) obtained are shown in Table 2.

TABLE 2

|  | Photoaligning agent | Adhesive tape peel |
|---|---|---|
| Example 28 | FA-1 | 100/100 |
| Example 29 | FA-2 | 100/95 |
|  | FA-3 | 100/79 |
|  | FA-4 | 100/97 |
| Comparative example 9 | FA-5 | 100/37 |

It was found, by the comparison of Example 28 and Example 29 with Comparative example 9, that the photoalignment film of the invention was superior in adhesion to a TAC film which had been previously treated by a saponification process.

INDUSTRIAL APPLICABILITY

The photoaligning agent of the invention includes a photosensitive polymer, and is suitable for the photoalignment method. A liquid crystal alignment film prepared from the photoaligning agent has no alignment defects and gives uniform orientation of the liquid crystal molecules, since the rubbing treatment is not necessary. Accordingly, the film is suitable for use in an optical film and a liquid crystal display device.

Although the invention has been described and illustrated with a certain degree of particularity, it is understood that the disclosure has been made only by way of example, and that numerous changes in the conditions and order of steps can be resorted to by those skilled in the art without departing from the spirit and scope of the invention.

What is claimed is:

1. A photosensitive compound represented by formula (1):

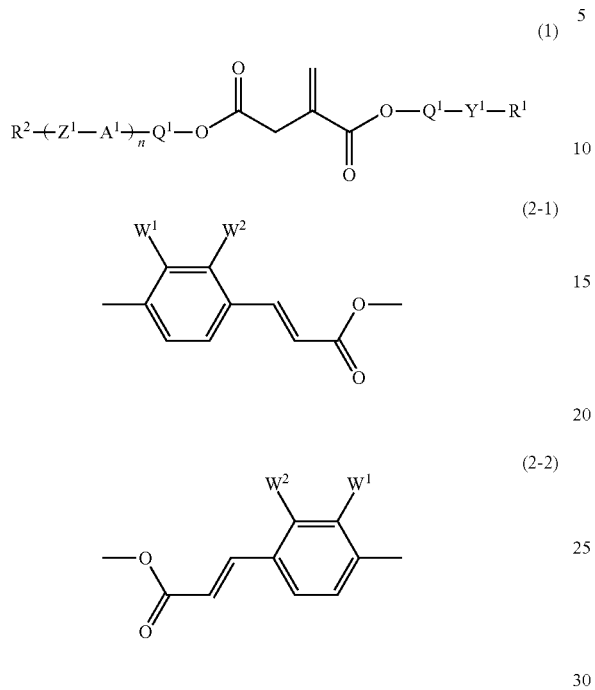

wherein in formula (1),
- $Y^1$ is a divalent group represented by formula (2-1) or (2-2);
- $A^1$ is 1,4-phenylene, 1,4-cyclohexylene, pyridine-2,5-diyl, pyrimidine-2,5-diyl, naphthalene-2,6-diyl, tetrahydronaphthalene-2,6-diyl or 1,3-dioxane-2,5-diyl, and in the 1,4-phenylene, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons;
- $Z^1$ is a single bond, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—;
- $R^1$ and $R^2$ are each independently hydrogen, fluorine, chlorine, —OH, —C≡N, —NO$_2$, trifluoromethyl, alkyl having 1 to 10 carbons or alkoxy having 1 to 10 carbons;
- $Q^1$ is independently a single bond or alkylene having 1 to 12 carbons, and in the alkylene, arbitrary hydrogen my be replaced by fluorine and arbitrary —CH$_2$— may be replaced by —O—, —COO—, —OCO—, —CH=CH— or —C≡C—;
- n is 0 to 3; and wherein in formulas (2-1) and (2-2),
- $W^1$ and $W^2$ are each independently hydrogen, fluorine, chlorine, trifluoromethyl, alkyl having 1 to 5 carbons or alkoxy having 1 to 5 carbons.

2. A polymer formed by polymerization of a photosensitive compound represented by formula (1):

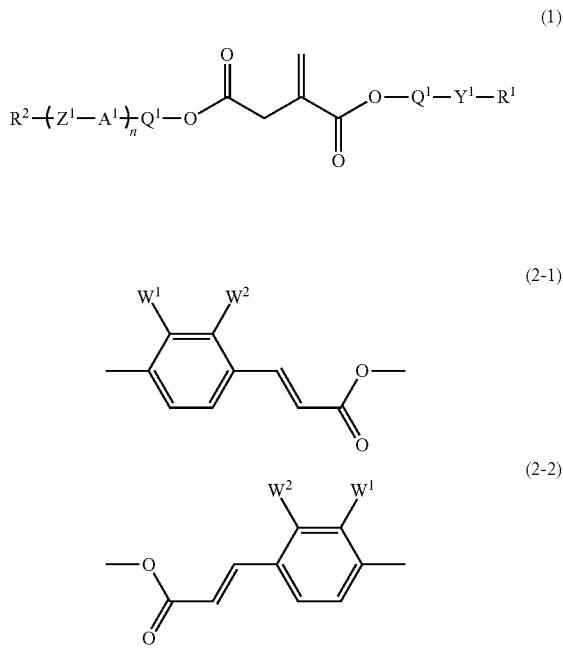

wherein in formula (1),
- $Y^1$ is a divalent group represented by formula (2-1) or (2-2);
- $A^1$ is 1,4-phenylene, 1,4-cyclohexylene, pyridine-2,5-diyl, pyrimidine-2,5-diyl, naphthalene-2,6-diyl, tetrahydronaphthalene-2,6-diyl or 1,3-dioxane-2,5-diyl, and in the 1,4-phenylene, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons:
- $Z^1$ is a single bond, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—;
- $R^1$ and $R^2$ are each independently hydrogen, fluorine, chlorine, —OH, —C≡N, —NO$_2$, trifluoromethyl, alkyl having 1 to 10 carbons or alkoxy having 1 to 10 carbons;
- $Q^1$ is independently a single bond or alkylene having 1 to 12 carbons, and in the alkylene, arbitrary hydrogen may be replaced by fluorine and arbitrary —CH$_2$— may be replaced by —O—, —COO—, —OCO—, —CH=CH— or —C≡C—;
- n is 0 to 3; and wherein in formulas (2-1) and (2-2),
- $W^1$ and $W^2$ are each independently hydrogen, fluorine, trifluoromethyl, alkyl having 1 to 5 carbons or alkoxy having 1 to 5 carbons.

3. A photosensitive compound represented by formula (1-1):

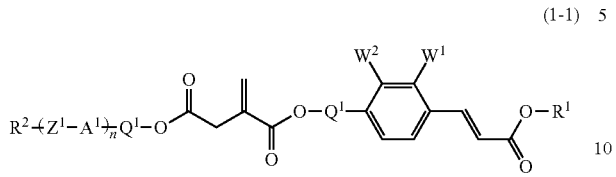
(1-1)

wherein in formula (I-1),
$W^1$ and $W^2$ are each independently hydrogen, alkyl having 1 to 3 carbons or alkoxy having 1 to 3 carbons;
$A^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;
$Z^1$ is a single bond, —COO—, —OCO—, —CH=CH—COO—, —OCO—CH=CH—, —OCO—CH$_2$CH$_2$— or —CH$_2$CH$_2$—COO—;
$R^1$ is hydrogen or alkyl having 1 to 5 carbons;
$R^2$ is hydrogen, fluorine, alkyl having 1 to 5 carbons or alkoxy having 1 to 5 carbons;
$Q^1$ is independently a single bond or alkylene having 1 to 12 carbons, and arbitrary —CH$_2$— may be replaced by —O—; and
n is 0 or 1.

4. A composition comprising a polymer formed by polymerization of a photosensitive compound according to claim 2.

5. The polymer formed by polymerization of the photosensitive compound according to claim 2, wherein in formula (1),

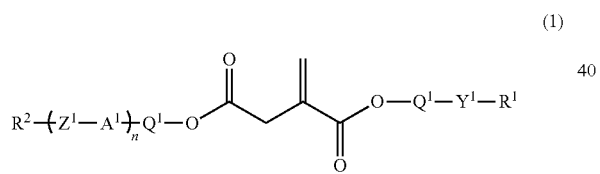
(1)

$Y^1$ is a divalent group represented by formula (2-1) or (2-2);

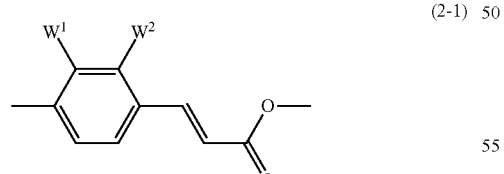
(2-1)

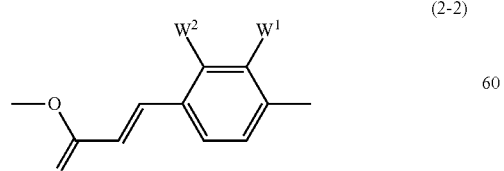
(2-2)

$A^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;
$Z^1$ is a single bond, —COO—, —OCO—, —CH=CH—COO—, —OCO—CH=CH—, —OCO—CH$_2$CH$_2$— or —CH$_2$CH$_2$—COO—;
$R^1$ and $R^2$ are each independently hydrogen, fluorine, alkyl having 1 to 5 carbons or alkoxy having 1 to 5 carbons;
$Q^1$ is independently a single bond or alkylene having 1 to 12 carbons, and arbitrary —CH$_2$— may be replaced by —O—;
n is 0 or 1; and
wherein in formulas (2-1) and (2-2),
$W^1$ and $W^2$ are each independently hydrogen, alkyl having 1 to 3 carbons or alkoxy having 1 to 3 carbons.

6. A photosensitive polymer having a structural unit represented by formula (3):

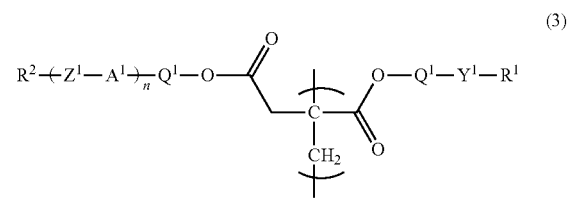
(3)

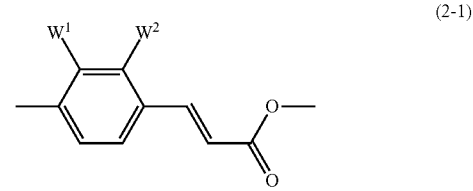
(2-1)

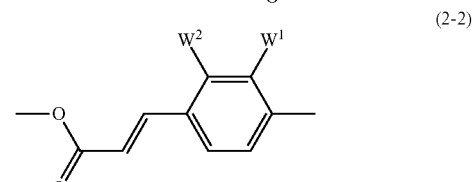
(2-2)

wherein in formula (3),
$Y^1$ is a divalent group represented by formula (2-1) or (2-2);
$A^1$ is 1,4-phenylene, 1,4-cyclohexylene, pyridine-2,5-diyl, pyrimidine-2,5-diyl, naphthalene-2,6-diyl, tetrahydronaphthalene-2,6-diyl or 1,3-dioxane-2,5-diyl, and in the 1,4-phenylene, arbitrary hydrogen may be replaced by fluorine, chlorine, cyano, hydroxy, formyl, acetoxy, acetyl, trifluoroacetyl, difluoromethyl, trifluoromethyl, alkyl having 1 to 5 carbons or alkoxy having 1 to 5 carbons;
$Z^1$ is a single bond, —COO—, —OCO—, —CH=CH—COO—, —OCO—CH=CH—, —OCO—CH$_2$CH$_2$—, —CH$_2$CH$_2$—COO—, —C≡C—COO—, —OCO—C≡C—, —CH$_2$O—, —OCH$_2$—, —CF$_2$O—, —OCF$_2$—, —CONH—, —NHCO—, —(CH$_2$)$_4$—, —CH$_2$CH$_2$—, —CF$_2$CF$_2$—, —CH=CH—, —CF=CF— or —C≡C—;
$R^1$ and $R^2$ are each independently hydrogen, fluorine, chlorine, —OH, —C≡N, —NO$_2$, trifluoromethyl, alkyl having 1 to 10 carbons or alkoxy having 1 to 10 carbons;
$Q^1$ is independently a single bond or alkylene having 1 to 12 carbons, and in the alkylene, arbitrary hydrogen may be replaced by fluorine and arbitrary —CH$_2$— may be replaced by —O—, —COO—, —OCO—, —CH=CH— or —C≡C—;

n is 0 to 3; and wherein in formulas (2-1) and (2-2),

W$^1$ and W$^2$ are each independently hydrogen, fluorine, chlorine, trifluoromethyl, alkyl having 1 to 5 carbons or alkoxy having 1 to 5 carbons.

7. The photosensitive polymer according to claim 6, wherein in formula (3),

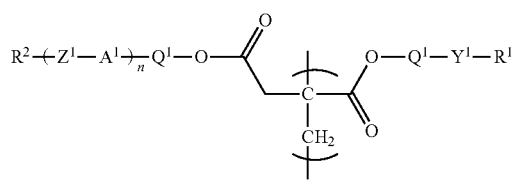

(3)

Y$^1$ is a divalent group represented by formula (2-1) or (2-2);

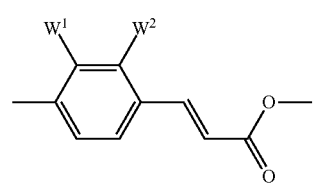

(2-1)

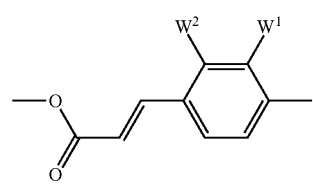

(2-2)

A$^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;

Z$^1$ is a single bond, —COO—, —OCO—, —CH=CH—COO—, —OCO—CH=CH—, —OCO—CH$_2$CH$_2$— or —CH$_2$CH$_2$—COO—;

R$^1$ and R$^2$ are each independently hydrogen, fluorine, alkyl having 1 to 5 carbons or alkoxy having 1 to 5 carbons;

Q$^1$ is independently a single bond or alkylene having 1 to 12 carbons, and arbitrary —CH$_2$— may be replaced by —O—;

n is 0 or 1; and wherein in formulas (2-1) and (2-2),

W$^1$ and W$^2$ are each independently hydrogen, alkyl having 1 to 3 carbons or alkoxy having 1 to 3 carbons.

8. A photosensitive polymer having the structural unit represented by formula (3-1):

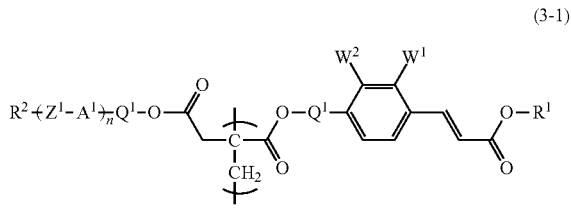

(3-1)

wherein in formula (3-1),

W$^1$ and W$^2$ are each independently hydrogen, alkyl having 1 to 3 carbons or alkoxy having 1 to 3 carbons;

A$^1$ is 1,4-phenylene or 1,4-cyclohexylene, and in the 1,4-phenylene, arbitrary hydrogen may be replaced by fluorine, trifluoromethyl, alkyl having 1 to 3 carbons or alkoxy having 1 to 3 carbons;

Z$^1$ is a single bond, —COO—, —OCO—, —CH=CH—COO—, —OCO—CH=CH—, —OCO—CH$_2$CH$_2$— or —CH$_2$CH$_2$—COO—;

R$^1$ is hydrogen or alkyl having 1 to 5 carbons;

R$^2$ is hydrogen, fluorine, alkyl having 1 to 5 carbons or alkoxy having 1 to 5 carbons;

Q$^1$ is independently a single bond or alkylene having 1 to 12 carbons, and arbitrary —CH$_2$— may be replaced by —O—; and n is 0 or 1.

9. The photosensitive polymer according to claim 2, wherein the weight-average molecular weight is in the range of approximately 1,000 to approximately 500,000.

10. A homopolymer having the structural unit according to claim 6.

11. A copolymer comprising the structural unit represented by formula (3)

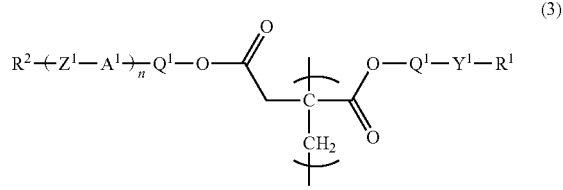

(3)

and at least one of structural units represented by the other formulas that are different from formula (3).

12. A photosensitive material prepared from the polymer according to claim 2.

13. A photoaligning agent for use in a liquid crystal alignment film prepared from the polymer according to claim 2.

14. A liquid crystal alignment film prepared from the photoaligning agent according to claim 13.

15. A liquid crystal display device containing the liquid crystal alignment film according to claim 14.

* * * * *